US012636890B2

(12) United States Patent
Takahashi et al.

(10) Patent No.: US 12,636,890 B2
(45) Date of Patent: May 26, 2026

(54) CONTROL METHOD OF LIQUID DISCHARGE APPARATUS AND LIQUID DISCHARGE APPARATUS

(71) Applicant: SEIKO EPSON CORPORATION, Tokyo (JP)

(72) Inventors: Ryota Takahashi, Shiojiri (JP); Sawako Tsujimura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 262 days.

(21) Appl. No.: 18/617,934

(22) Filed: Mar. 27, 2024

(65) Prior Publication Data

US 2024/0326453 A1 Oct. 3, 2024

(30) Foreign Application Priority Data

Mar. 30, 2023 (JP) ................................. 2023-056481

(51) Int. Cl.
*B41J 2/175* (2006.01)
*B41J 2/21* (2006.01)

(52) U.S. Cl.
CPC ......... *B41J 2/17503* (2013.01); *B41J 2/2114* (2013.01); *B41J 2002/17589* (2013.01)

(58) Field of Classification Search
CPC ...... B41J 2/04581; B41J 2/0451; B41J 2/175; B41J 2/04571; B41J 2/1652; C09D 11/30; C09D 11/322; D06P 1/44; D06P 5/30
See application file for complete search history.

(56) References Cited

U.S. PATENT DOCUMENTS

| | | | | |
|---|---|---|---|---|
| 7,300,131 B2 * | 11/2007 | Sakagami | B41J 2/0451 347/30 |
| 8,100,500 B2 * | 1/2012 | Bansyo | B41J 2/185 347/7 |
| 8,931,867 B2 * | 1/2015 | Kamiyama | B41J 2/175 347/7 |
| 10,150,305 B2 * | 12/2018 | Mozel | C11D 3/349 |
| 11,472,978 B2 * | 10/2022 | Shipway | C08K 5/06 |
| 11,898,043 B2 * | 2/2024 | Aoki | D06P 1/525 |

(Continued)

FOREIGN PATENT DOCUMENTS

| | | |
|---|---|---|
| JP | 2003-312004 A | 11/2003 |
| JP | 2013-107398 A | 6/2013 |

*Primary Examiner* — John P Zimmermann
(74) *Attorney, Agent, or Firm* — WORKMAN NYDEGGER

(57) ABSTRACT

A liquid discharge apparatus includes a liquid discharge head, an attachment unit, and an operation unit including a display unit. The attachment unit includes a first attachment portion for a first liquid reservoir unit that reserves a first liquid, and a second attachment portion fora second liquid reservoir unit that reserves a second liquid having a sedimentation property inferior to that of the first liquid. A control method includes, in a case in which execution of a replacement mode is instructed, displaying information for prompting removal of the first liquid reservoir unit, displaying information for prompting attachment of a different second liquid reservoir unit from the second liquid reservoir unit attached to the second attachment portion, to the first attachment portion, and supplying the second liquid to nozzles that discharge the first liquid when the different second liquid reservoir unit is attached to the first attachment portion.

11 Claims, 21 Drawing Sheets

(56) References Cited

U.S. PATENT DOCUMENTS

| | | | | |
|---|---|---|---|---|
| 12,409,666 | B2 * | 9/2025 | Orihara | B41M 5/52 |
| 2010/0026749 | A1 | 2/2010 | Kagata | |
| 2012/0249638 | A1 * | 10/2012 | Takano | B41J 2/0454<br>347/10 |
| 2015/0062226 | A1 * | 3/2015 | Otokita | B41J 2/04581<br>347/14 |
| 2016/0271943 | A1 * | 9/2016 | Tobita | B41J 2/16585 |

* cited by examiner

CONTROL METHOD OF LIQUID DISCHARGE APPARATUS AND LIQUID DISCHARGE APPARATUS

The present application is based on, and claims priority from JP Application Serial Number 2023-056481, filed Mar. 30, 2023, the disclosure of which is hereby incorporated by reference herein in its entirety.

BACKGROUND

1. Technical Field

The present disclosure relates to a control method of a liquid discharge apparatus including a liquid discharge head that discharges a liquid, and a liquid discharge apparatus.

2. Related Art

For example, JP-A-2013-107398 discloses a recording apparatus (an example of a liquid discharge apparatus) such as an inkjet printer that includes a recording head (an example of a liquid discharge head), discharges liquid droplets onto a medium such as a paper sheet, and forms a print image by attaching the liquid droplets onto the medium. In this type of recording apparatus, the liquid discharge head includes a nozzle that discharges a liquid such as ink.

The recording apparatus described in JP-A-2013-107398 is configured to exchange ink and an anti-clogging liquid in order to prevent the residual ink in a specific nozzle from being left for a long time and clogging the nozzle.

Specifically, the recording head includes a specific nozzle that is selectively filled with an image forming liquid such as ink and an anti-clogging liquid for preventing clogging of the nozzle. A control unit of the recording apparatus performs control to switch from a first filling state in which the specific nozzle is filled with the image forming liquid to a second filling state in which the specific nozzle is filled with the anti-clogging liquid according to a predetermined condition.

However, the recording apparatus requires a liquid dedicated to clogging prevention (anti-clogging liquid) separately from a liquid such as ink used for printing. For example, it is necessary to prepare a dedicated liquid reservoir container for holding the anti-clogging liquid separately from the liquid holding container for holding a liquid such as ink. This causes problems of cost for preparing the dedicated liquid holding container and a space for storing the dedicated liquid holding container.

Since a dedicated liquid is required separately from the liquid used for printing, there is a demand for a control method of a liquid discharge apparatus and a liquid discharge apparatus capable of solving the problems of cost and space.

SUMMARY

In order to solve the above problems, a control method of a liquid discharge apparatus, the liquid discharge apparatus including a liquid discharge head including a plurality of nozzles and configured to perform printing on a medium by discharging a liquid from the plurality of nozzles, an attachment unit to which a plurality of liquid reservoir units reserving the liquid to be supplied to the plurality of nozzles is attachable, and an operation unit including a display unit, the attachment unit including a first attachment portion to which a first liquid reservoir unit reserving a first liquid having a sedimentation property is to be attached and a second attachment portion to which a second liquid reservoir unit reserving a second liquid having a sedimentation property inferior to that of the first liquid is to be attached, includes, in a case in which execution of a replacement mode is instructed via operation of the operation unit, displaying, on the display unit, display information for prompting removal of the first liquid reservoir unit from the first attachment portion, displaying, on the display unit, display information for prompting attachment of a different second liquid reservoir unit from the second liquid reservoir unit attached to the second attachment portion, to the first attachment portion, and when the different second liquid reservoir unit is attached to the first attachment portion, supplying the second liquid to the plurality of nozzles configured to discharge the first liquid.

In order to solve the above problems, a liquid discharge apparatus includes a liquid discharge head including a plurality of nozzles and configured to perform printing on a medium by discharging a liquid from the plurality of nozzles, an attachment unit to which a plurality of liquid reservoir units reserving the liquid to be supplied to the plurality of nozzles is attachable, an operation unit including a display unit, and a control unit, in which the attachment unit includes a first attachment portion to which a first liquid reservoir unit reserving a first liquid having a sedimentation property is to be attached and a second attachment portion to which a second liquid reservoir unit reserving a second liquid having a sedimentation property inferior to that of the first liquid is to be attached, and in a case in which execution of a replacement mode is instructed via operation of the operation unit, the control unit is configured to display, on the display unit, display information for prompting removal of the first liquid reservoir unit from the first attachment portion and display information for prompting attachment of a different second liquid reservoir unit from the second liquid reservoir unit attached to the second attachment portion, to the first attachment portion, and when the different second liquid reservoir unit is attached to the first attachment portion, the control unit supplies the second liquid to the plurality of nozzles configured to discharge the first liquid.

DESCRIPTION OF EMBODIMENTS

First Embodiment

Figure 1:
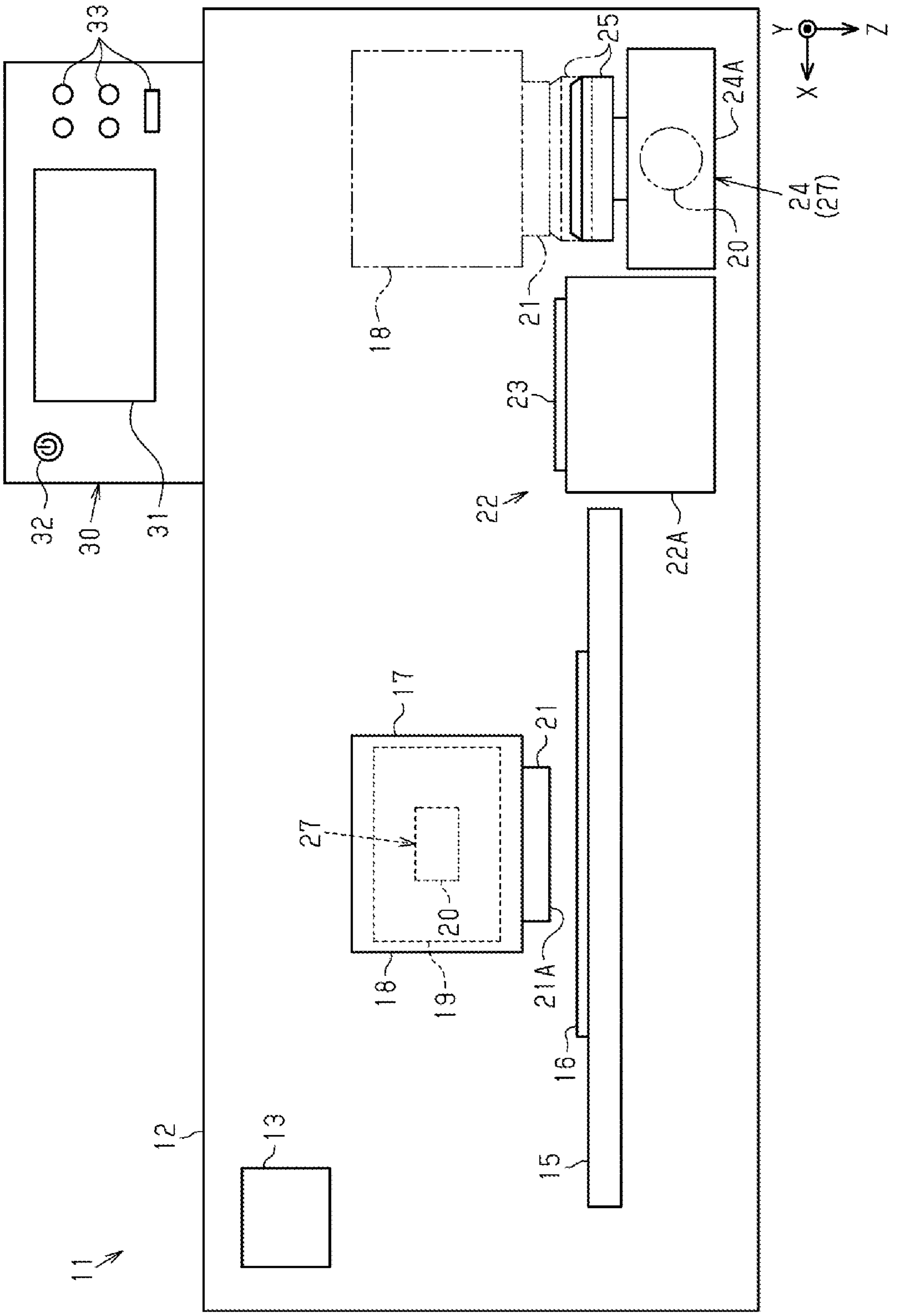
FIG. 1 is a schematic front view of a liquid discharge apparatus according to a first embodiment.

Hereinafter, a liquid discharge apparatus and a control method of the liquid discharge apparatus according to a first embodiment will be described with reference to the drawings. The liquid discharge apparatus is an inkjet printer that discharges ink, which is an example of a liquid, onto a medium such as paper, fabric, vinyl, plastic parts, or metal parts to perform printing on the medium, for example. In the drawings, a Z-axis represents a direction of gravity and an X-axis and a Y-axis represent directions along a horizontal plane, assuming that a liquid discharge apparatus 11 is placed on the horizontal plane. The X-axis, the Y-axis, and the Z-axis are perpendicular to one another.

Configuration of Liquid Discharge Apparatus 11

As illustrated in FIG. 1, the liquid discharge apparatus 11 may include a housing 12 and a control unit 13. The housing 12 houses various components of the liquid discharge apparatus 11.

The control unit 13 comprehensively controls driving of each mechanism in the liquid discharge apparatus 11 and controls various operations performed in the liquid discharge apparatus 11.

The liquid discharge apparatus 11 may include a support unit 15. The support unit 15 is configured to support a medium 16. The support unit 15 supports the medium 16, for example.

The liquid discharge apparatus 11 may include a carriage 17, an attachment unit 18, a liquid reservoir unit 19, a pump 20, and a liquid discharge head 21. The liquid discharge apparatus 11 may further include a wiping unit 22 and a cap mechanism 24 outside a printing region that is a region where the liquid discharge head 21 moves to discharge a liquid onto the medium 16. The wiping unit 22 and the cap mechanism 24 are used for maintenance of the liquid discharge head 21. The wiping unit 22 includes a wiper 23. The cap mechanism 24 may include a cap 25 and a pump 20.

The wiping unit 22 includes the wiper 23 that wipes a nozzle surface 21A of the liquid discharge head 21. The cap mechanism 24 is arranged at a position of facing the liquid discharge head 21 that is at a home position indicated by two-dot chain lines in FIG. 1, which is a position where the liquid discharge head 21 stands by without performing printing. The cap mechanism 24 includes a main body 24A that supports the cap 25 so as to be capable of moving up and down. The cap 25 moves between a retracted position where the cap 25 is retracted from the nozzle surface 21A of the liquid discharge head 21 located at the home position and a capping position where the cap 25 is in contact with the nozzle surface 21A.

The cap 25 and the liquid discharge head 21 may receive the liquid ejected from nozzles 40 (see FIG. 2) when performing cleaning that is one of maintenance works of ejecting the liquid from the nozzles 40. The position for receiving the liquid may be a position between the retracted position and the capping position.

The carriage 17 may movably hold the attachment unit 18, the liquid reservoir unit 19, the pump 20, and the liquid discharge head 21. That is, the liquid reservoir unit 19, the pump 20, and the liquid discharge head 21 may be mounted on the carriage 17.

Figure 2:
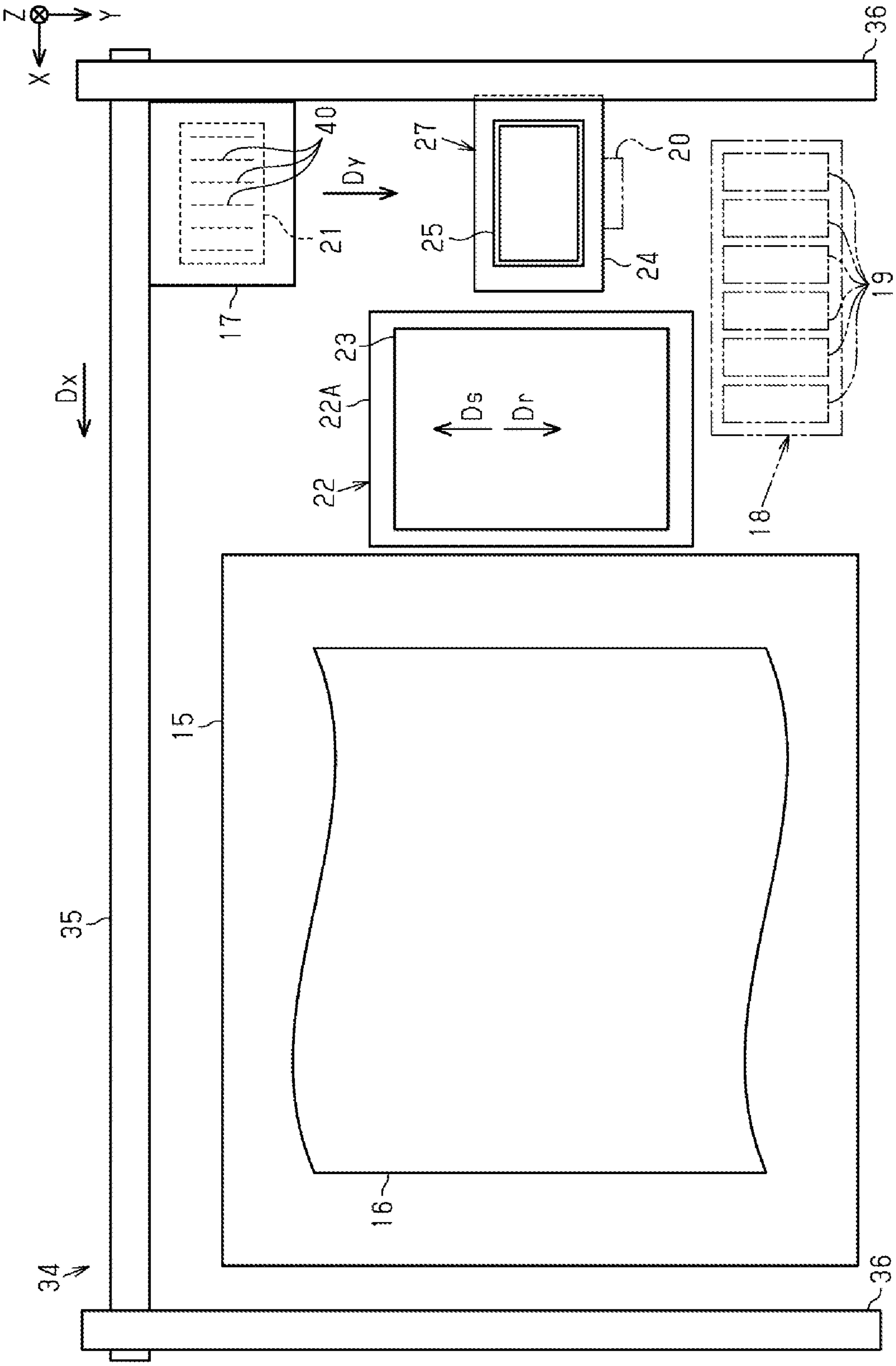
FIG. 2 is a schematic plan view of a portion including a movement mechanism in the liquid discharge apparatus.

The liquid reservoir unit 19 reserves a liquid to be supplied to the liquid discharge head 21. The attachment unit 18 (see also FIG. 3) can accept attachment of a plurality of liquid reservoir units 19. The liquid reserved in the liquid reservoir unit 19 is supplied to a plurality of nozzles 40 (see FIG. 2) of the liquid discharge head 21. As illustrated in FIG. 2, the attachment unit 18 may be arranged at a predetermined position in the housing 12. That is, the attachment unit 18 may be an on-carriage type in which the plurality of liquid reservoir units 19 is detachably mounted on the carriage 17, or an off-carriage type in which the plurality of liquid reservoir units 19 is detachably arranged at predetermined positions in the housing 12.

The liquid discharge apparatus 11 includes an operation unit 30 that is operated by an operator to give an instruction to the liquid discharge apparatus 11. The operation unit 30 includes a display unit 31. The operation unit 30 includes a power switch 32 and operation buttons 33. The operation unit 30 is an operation panel, for example. The display unit 31 is a liquid crystal display unit or an organic EL display unit, for example. The display unit 31 may be a touch panel. In this case, the touch operation function portion of the display unit 31 may constitute a part of the operation function portion of the operation unit 30 together with the operation buttons 33. In this case, the operation buttons 33 may not be provided. The power switch 32 may be provided in a place other than the operation unit 30, for example, on the surface of the housing 12. The operation unit 30 may be an operation panel provided to be angularly adjustable with respect to the housing 12, or may be fixed to the housing 12.

The pump 20 can supply a pressurized liquid to the liquid discharge head 21 by feeding the liquid in the liquid reservoir unit 19 in a direction from the liquid reservoir unit 19 toward the liquid discharge head 21. The pump 20 may perform pressurized ejection of ejecting the liquid from the nozzles 40 of the liquid discharge head 21 by pressurizing the liquid in the liquid discharge head 21. As a configuration for performing pressurized ejection, a choke valve (not illustrated) may be provided downstream of the pump 20. The choke valve may be closed in the middle of the supply flow path to accumulate the pressurized liquid in the middle of the flow path between the pump 20 and the choke valve, and the choke valve may be opened at once to pressurize and eject the liquid from the nozzles 40. When the liquid reservoir unit 19 is configured to house a liquid pack (not illustrated) that holds (reserves) a liquid, the pump 20 may supply air into the case of the liquid reservoir unit 19 and may pressurize the liquid pack under air pressure to supply the liquid to the nozzles 40 and eject the liquid from the nozzles 40. The pump 20 for cleaning by forcibly ejecting the liquid from the nozzles 40 constitutes a maintenance unit 27.

The wiping unit 22 is capable of wiping the nozzle surface 21A where the nozzles 40 of the liquid discharge head 21 are opened. The wiping unit 22 may be a cloth wiper unit including cloth as the wiper 23, for example. The wiping unit 22 wipes the nozzle surface 21A by sliding the wiper 23 on the nozzle surface 21A. The wiping unit 22 is not limited to the configuration in which the cloth is the wiper 23, and may include a blade as a wiping member, for example. The blade is made of an elastic member such as rubber or elastomer, for example, and wipes the nozzle surface 21A by moving relative to the nozzle surface 21A of the liquid discharge head 21. A detailed configuration of the wiping unit 22 including the cloth wiper unit will be described later.

The cap mechanism 24 caps the liquid discharge head 21 with the cap 25 in order to suppress thickening or drying of the liquid in the nozzles 40. When the liquid discharge head 21 does not perform printing, the cap 25 caps the liquid discharge head 21 by covering the nozzle surface 21A in a state of surrounding the nozzles 40. The cap mechanism 24 is used to receive the liquid ejected from the nozzles 40 of the liquid discharge head 21 at the time of cleaning.

The cleaning is performed at a position where the liquid discharge head 21 faces the cap 25, and the liquid ejected from the nozzles 40 due to the cleaning is received by the cap 25. The cap 25 is coupled to a waste liquid reservoir portion (not illustrated) through an ejection flow path (not illustrated). The cap mechanism 24 may include the pump 20 indicated by two-dot chain lines in FIG. 1. In this case, the pump 20 is a suction pump. The pump 20 is provided in the middle of an ejection flow path (not illustrated) coupling the cap 25 and the waste liquid reservoir portion. The cap mechanism 24 may clean the liquid discharge head 21 by driving the pump 20. At the time of cleaning, the pump 20 is driven in the capping state to place the substantially sealed space surrounded by the cap 25 and the nozzle surface 21A under a negative pressure, whereby the liquid is forcibly ejected from the nozzles 40. The pump 20 and the cap mechanism 24 constitute the maintenance unit 27. When the pump 20 is driven, the liquid (waste liquid) in the cap 25 is collected by the suction force into the waste liquid reservoir portion through the ejection flow path.

As described above, the maintenance unit 27 includes the pump 20 that forcibly ejects the liquid from the nozzles 40 of the liquid discharge head 21. The pump 20 has the function of forcibly ejecting the liquid in the supply flow path 59 (see FIG. 11) that communicates the liquid reservoir unit 19 and the nozzles 40 of the liquid discharge head 21 from the nozzles 40. The pump 20 may be a pressurizing pump that forcibly ejects a liquid from the nozzles 40 by pressurizing the liquid in the direction from the liquid reservoir unit 19 toward the nozzles 40, or may be a suction pump that forcibly ejects a liquid from the nozzles 40 by sucking the liquid from the nozzles 40.

The pump 20 constituting the maintenance unit 27 is used for cleaning, and in the present embodiment, is also used for replacing the liquid in the supply flow path 59 (see FIG. 11) communicating between the liquid reservoir unit 19 and the nozzles 40 with another liquid. The replacement of the liquid will be described later in detail.

As illustrated in FIG. 2, the liquid discharge apparatus 11 may include a movement mechanism 34. The movement mechanism 34 may include a horizontal shaft 35 and vertical shafts 36. The movement mechanism 34 of the present embodiment includes a pair of vertical shafts 36.

The horizontal shaft 35 may extend in a scanning direction Dx. The pair of vertical shafts 36 may be provided in parallel to each other so as to extend in a sub-scanning direction Dy. The scanning direction Dx in the present embodiment is a direction parallel to the X axis. The sub-scanning direction Dy in the present embodiment is a direction perpendicular to the X axis and parallel to the Y axis.

The movement mechanism 34 causes the carriage 17 to reciprocate along the horizontal shaft 35. The movement mechanism 34 causes the horizontal shaft 35 supporting the carriage 17 to reciprocate along the vertical shafts 36. Therefore, the movement mechanism 34 can move the liquid discharge head 21 mounted on the carriage 17 in the scanning direction Dx and the sub-scanning direction Dy. The liquid discharge head 21 is movable relative to the wiping unit 22 in the scanning direction Dx and the sub-scanning direction Dy.

The movement mechanism 34 may move the liquid discharge head 21 simultaneously in the scanning direction Dx and the sub-scanning direction Dy. That is, the movement mechanism 34 may move the liquid discharge head 21 along a horizontal plane, obliquely with respect to the scanning direction Dx and the sub-scanning direction Dy.

In the liquid discharge apparatus 11, the carriage 17 scans the medium 16 so that the liquid discharge head 21 records an image on the medium 16. The carriage 17 of the present embodiment is configured to scan the medium 16 and also move in a direction intersecting the scanning direction. That is, the liquid discharge apparatus 11 of the present embodiment is a so-called lateral printer.

The support unit 15 may be configured not to move in directions opposite to the sub-scanning direction Dy and the sub-scanning direction Dy, or may be configured to move in the directions.

The liquid discharge apparatus 11 may include a conveyance unit 37 (see FIG. 9) that conveys the medium 16. The medium 16 may be conveyed by the conveyance unit 37 at the time of printing, or may be conveyed by the conveyance unit 37 in order to shift to the next printing every time one printing is completed. In the former case, the movement of the medium 16 in the sub-scanning direction Dy at the time of printing may be made by the movement of the support unit 15 and the conveyance of the medium 16 by the conveyance unit 37 in combination.

As illustrated in FIG. 2, the liquid discharge head 21 is configured to discharge a liquid. The liquid discharge head 21 includes a plurality of nozzles 40. The liquid discharge head 21 performs printing on the medium 16 by discharging a liquid from the nozzles 40. The liquid discharge head 21 discharges a liquid while moving with respect to the medium 16 supported by the support unit 15 to print an image on the medium 16.

As illustrated in FIG. 2, the wiping unit 22 may be provided at a position adjacent to the support unit 15, for example. The wiping unit 22 may be configured to collect a liquid from the liquid discharge head 21 as a waste liquid. The waste liquid is a liquid that does not contribute to an image to be printed on the medium 16. The waste liquid is generated by maintenance of the liquid discharge head 21, for example. For example, the wiping unit 22 may collect the waste liquid by receiving the liquid ejected from the liquid discharge head 21 located immediately above the wiping unit 22 by the wiper 23. As described above, the reception and collection of the liquid ejected from the nozzles 40 due to the maintenance may be performed by the wiping unit 22 instead of the cap mechanism 24 or in cooperation with the cap mechanism 24.

Examples of the maintenance for ejecting the liquid from the nozzles 40 by the liquid discharge head 21 include flushing, cleaning, pressurized ejection, and wiping.

The flushing is an operation of appropriately discharging a liquid from the nozzles 40 in order to suppress clogging of the nozzles 40. The flushing is performed before the recording, during the recording, or after the recording, for example. When the flushing is performed, the liquid discharge head 21 discharges a liquid from all the nozzles 40 toward the wiping unit 22.

The cleaning is an operation of forcibly ejecting a liquid from the nozzles 40 in order to discharge foreign matter, bubbles, and the like in the liquid discharge head 21. In the present embodiment, the cleaning may be performed to forcibly eject a liquid from the nozzles 40 by pressurizing the liquid in the liquid discharge head 21 by the pump 20 mounted on the carriage 17. The pressurized ejection may be performed as simple cleaning with a small ejection amount. The pressurized ejection is performed before printing and after printing, for example. The pressurized ejection may be periodically performed during a standby time when printing is not performed.

The wiping is an operation of wiping the nozzle surface 21A to remove the liquid adhering to the nozzle surface 21A of the liquid discharge head 21. The wiping is performed after cleaning, for example. After the cleaning, there is a possibility that liquid droplets having splattered at the ejection of the liquid adhere to the nozzle surface 21A, or no menisci of the liquid having an appropriate shape are formed in the nozzles 40. Performing the wiping removes the liquid adhering to the nozzle surface 21A and forms menisci of the liquid having an appropriate shape are formed in the nozzles 40.

Configuration of Attachment Unit 18

Next, configurations of the attachment unit 18 and the liquid reservoir unit 19 will be described with reference to FIGS. 3 to 5. Although an example of an on-carriage type in which the attachment unit 18 is mounted on the carriage 17 will be described in FIGS. 3 to 5, the attachment unit 18 may be an attachment unit corresponding to an off-carriage type as indicated by two-dot chain lines in FIG. 2. The configuration of the attachment unit 18 of the off-carriage type is substantially the same as that of the on-carriage type.

Figure 3:
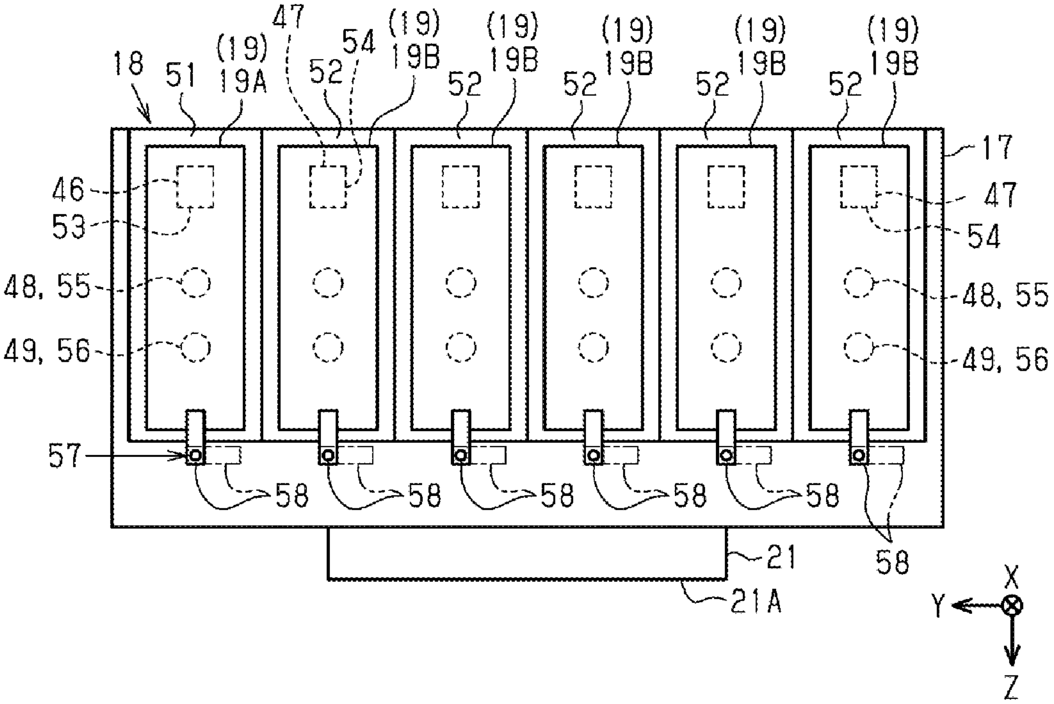
FIG. 3 is a schematic side view of a carriage equipped with an attachment unit.

As illustrated in FIG. 3, the attachment unit 18 includes a plurality of attachment portions 51 and 52 to which a plurality of liquid reservoir units 19 is detachably attached. Specifically, the attachment unit 18 includes a first attachment portion 51 to which a first liquid reservoir unit 19A that reserves a first liquid L1 (see FIG. 11) having a sedimentation property is attached, and a second attachment portion 52 to which a second liquid reservoir unit 19B that reserves the second liquid L2 (see FIG. 19) having a sedimentation property inferior to that of the first liquid L1 is attached. In the present embodiment, as illustrated in FIGS. 3 to 6, the attachment unit 18 includes one first attachment portion 51 and a plurality of (for example, five) second attachment portions 52. The number of each of the first attachment portions 51 and the second attachment portions 52 may be changed as appropriate as long as each is one or more. For example, the number of the first attachment portions 51 and the number of the second attachment portions 52 may be the same, or the number of the first attachment portions 51 may be greater than the number of the second attachment portions 52. For example, a plurality of first attachment portions 51 and one second attachment portion 52 may be provided.

Figure 5:
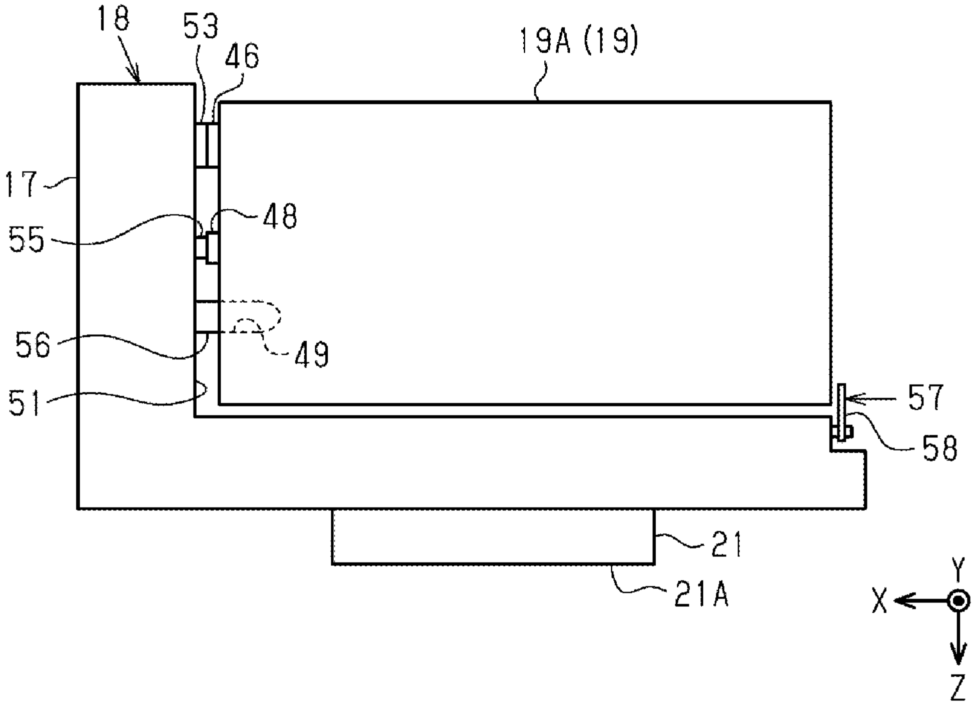
FIG. 5 is a schematic front view of the carriage equipped with the attachment unit.
Figure 6:
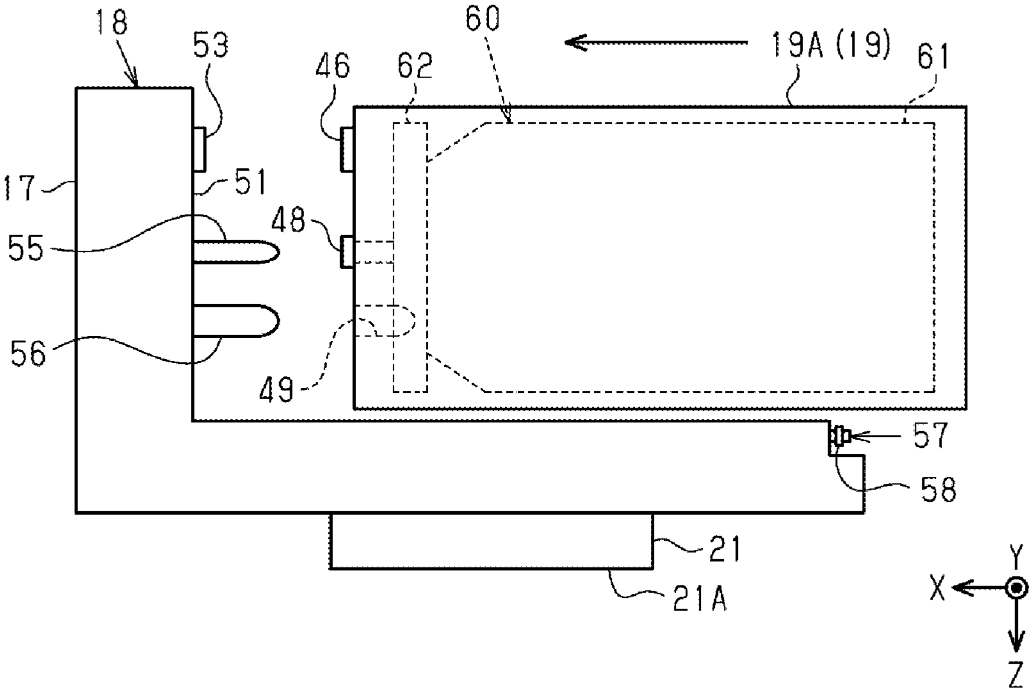
FIG. 6 is a schematic front view of attachment and detachment of a liquid reservoir unit to and from the attachment unit.

As illustrated in FIGS. 3, 5, and 6, the liquid reservoir units 19A and 19B each include storage elements 46 and 47, a supply portion 48, and a pin hole 49 on the attachment surfaces to be attached to the attachment portions 51 and 52. That is, the first liquid reservoir unit 19A includes the first storage element 46, the supply portion 48, and the pin hole 49 on the attachment surface thereof. As illustrated in FIG. 3, the second liquid reservoir unit 19B includes the second storage element 47, the supply portion 48, and the pin hole 49 on the attachment surface thereof.

The attachment portions 51 and 52 each include coupling portions 53 and 54 that can be coupled to the storage elements 46 and 47, a supply needle 55 that can be coupled to the supply portion 48, and a positioning pin 56 insertable into the pin hole 49. That is, the first attachment portion 51 includes the first coupling portion 53 that can be coupled to the first storage element 46, the supply needle 55 that can be coupled to the supply portion 48, and the positioning pin 56 insertable into the pin hole 49. As illustrated in FIG. 3, the second attachment portion 52 includes the second coupling portion 54 that can be coupled to the second storage element 47, the supply needle 55 that can be coupled to the supply portion 48, and the positioning pin 56 insertable into the pin hole 49.

Figure 4:
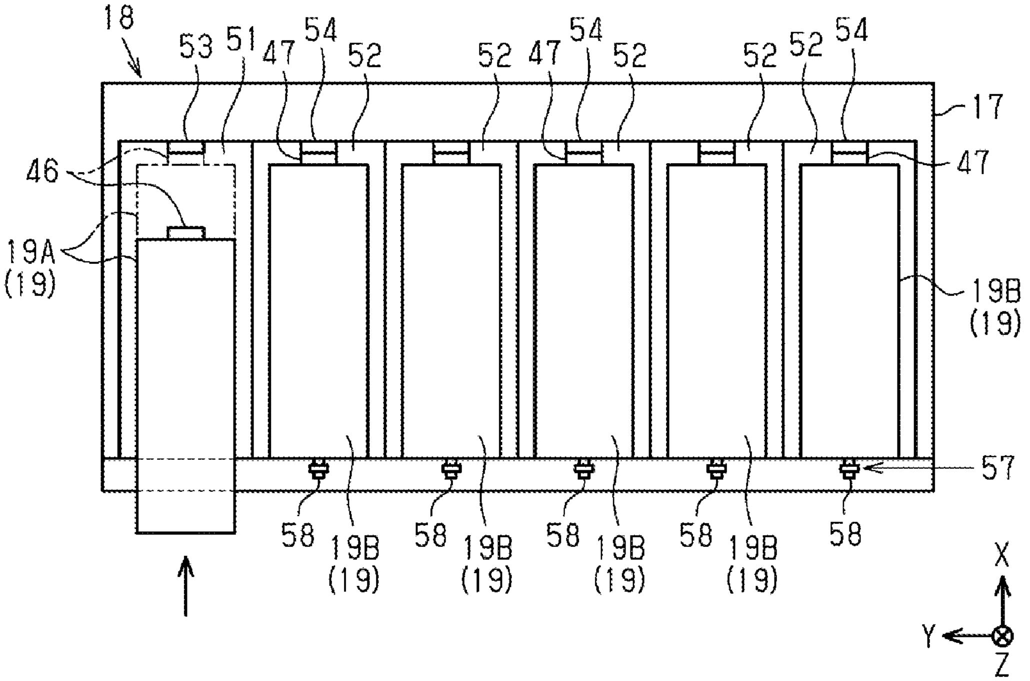
FIG. 4 is a schematic plan view of the carriage equipped with the attachment unit.

As illustrated in FIGS. 4 and 5, the first liquid reservoir unit 19A is coupled to the first attachment portion 51, whereby the first storage element 46 is electrically coupled to the first coupling portion 53. As illustrated in FIG. 4, the second liquid reservoir unit 19B is attached to the second attachment portion 52, whereby the second storage element 47 is electrically coupled to the second coupling portion 54.

As illustrated in FIG. 6, the liquid reservoir unit 19 houses a liquid pack 60, for example. The liquid pack 60 includes a pack body 61 and a supply member 62 fixed to an opening at one end of the pack body 61 in a liquid-tight state. The supply member 62 includes the supply portion 48 that supplies the liquid reserved in the pack body 61.

Configuration of Lock Mechanism 57

As illustrated in FIGS. 3 to 6, the attachment unit 18 includes a lock mechanism 57 that locks the plurality of liquid reservoir units 19 attached to the attachment portions 51 and 52 in an unremovable manner. The lock mechanism 57 may lock the plurality of liquid reservoir units 19 attached to the attachment portions 51 and 52 in an individually unremovable manner, or may lock the plurality of liquid reservoir units 19 in a collectively unremovable manner. The lock mechanism 57 includes a lock member 58 for each of the attachment portions 51 and 52. The lock member 58 is movable between a restriction position for restricting the movement of the liquid reservoir unit 19 in the removal direction and a restriction release position for allowing the movement of the liquid reservoir unit 19 in the removal direction. The lock mechanism 57 includes an electric motor as a drive source capable of electrically moving the lock member 58. The rotational force of the electric motor is transmitted to the lock member 58 via a cam mechanism (not illustrated). When the electric motor is driven in the forward direction, the lock member 58 moves from the restriction release position to the restriction position. On the other hand, when the electric motor is driven in the reverse direction, the lock member 58 moves from the restriction position to the restriction release position. By individually controlling the plurality of lock members 58, the control unit 13 enables the operator to select the liquid reservoir unit 19 to be removed and selectively release the lock thereof.

Figure 7:
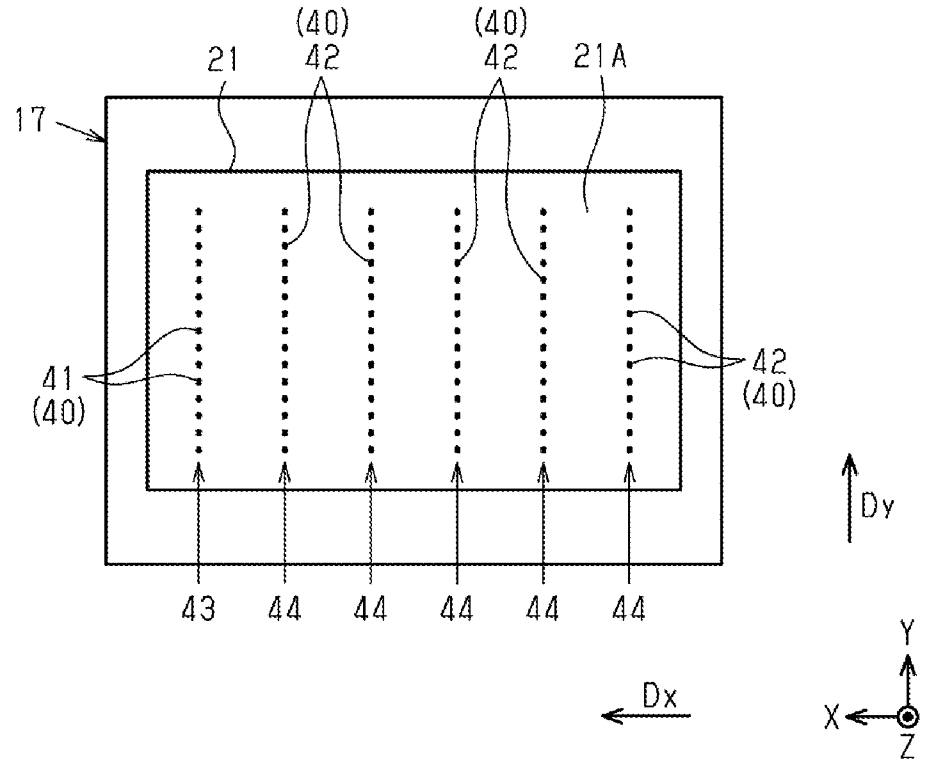
FIG. 7 is a bottom view of the liquid discharge head.

As illustrated in FIG. 7, the liquid discharge head 21 includes the nozzle surface 21A. A plurality of nozzle rows 43 and 44 is formed at the nozzle surface 21A by the plurality of nozzles 40. One first nozzle row 43 and five second nozzle rows 44 are formed at the nozzle surface 21A of the present embodiment. Each of the nozzle rows 43 and 44 is formed by the plurality of nozzles 40 arranged in the sub-scanning direction Dy. The total number of the nozzle rows 43 and 44 is not limited to six, and may be set to any number of two or more, for example, four, five, seven, eight, or ten or more.

The plurality of nozzle rows 43 and 44 extends in the sub-scanning direction Dy and is formed at predetermined intervals in the scanning direction Dx. The plurality of nozzle rows 43 and 44 may be formed at equal intervals in the scanning direction Dx, or may be formed at different intervals.

For example, the liquid discharge head 21 may discharge white ink from one first nozzle row 43. Five types of ink having different colors such as cyan, magenta, yellow, black, and clear may be discharged from the five second nozzle rows 44.

In the embodiment, the white ink is the first liquid L1, and the ink of the other colors, that is, the five types of ink of cyan, magenta, yellow, black, and clear are the second liquid L2. The first liquid L1 is ink having a sedimentation property superior to that of the second liquid L2. In other words, the second liquid L2 is ink having a sedimentation property inferior to that of the first liquid L1 or having no sedimentation property.

The first nozzle row 43 includes a plurality of first nozzles 41 arranged at a predetermined nozzle pitch in the sub-scanning direction Dy. The first nozzles 41 are nozzles 40 that discharge white ink, which is the first liquid L1, during printing. The second nozzle row 44 includes a plurality of second nozzles 42 arranged at a predetermined nozzle pitch in the sub-scanning direction Dy. The second nozzles 42 are nozzles 40 that discharge the second liquid L2 during printing. The plurality of (for example, five) second nozzle rows 44 discharges ink of cyan, magenta, yellow, black, and clear.

The first nozzles 41 discharge the first liquid L1 supplied from the first liquid reservoir unit 19A attached to the first attachment portion 51. The second nozzles 42 discharge the second liquid L2 supplied from the second liquid reservoir unit 19B attached to the second attachment portion 52. The combination of the numbers of the first nozzle rows 43 and the second nozzle rows 44 may be changed as appropriate in accordance with the combination of the numbers of the first attachment portions 51 and the second attachment portions 52.

Configuration of Wiping Unit 22

Figure 8:
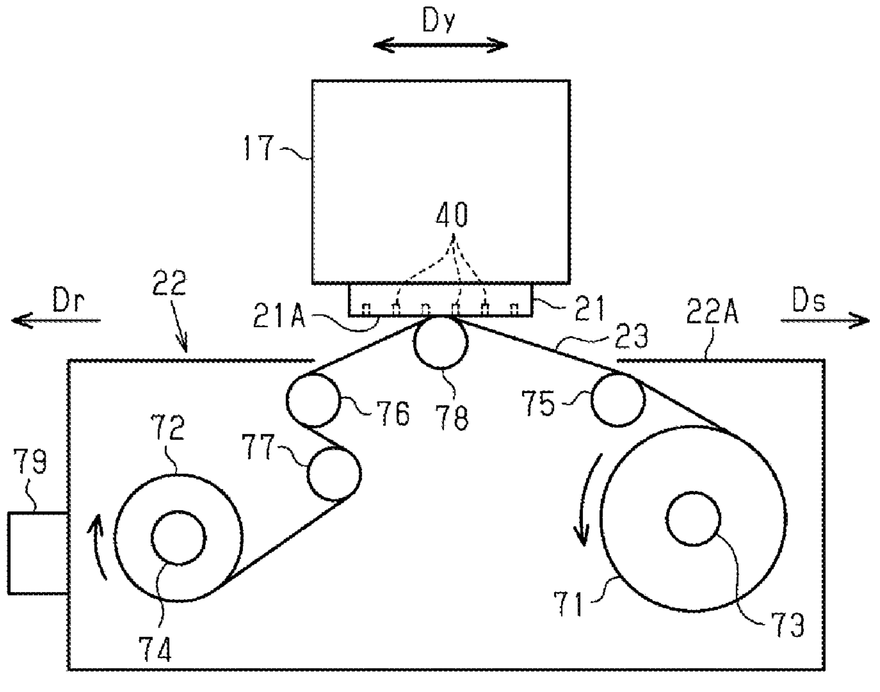
FIG. 8 is a schematic side sectional view of a configuration of a wiping unit.

As illustrated in FIG. 8, the wiping unit 22 may include a case 22A, the wiper 23, a feeding portion 71, and a winding portion 72. The feeding portion 71 has a feeding shaft 73. The winding portion 72 includes a winding shaft 74. The wiping unit 22 may include a first guide roller 75, a second guide roller 76, a third guide roller 77, and a pressing roller 78. The wiping unit 22 includes a winding motor 79 that drives the winding shaft 74.

The first guide roller 75, the second guide roller 76, the pressing roller 78, and the third guide roller 77 are provided in this order from the upstream in a feeding direction Ds. In the case 22A, the feeding shaft 73, the winding shaft 74, the first guide roller 75 to the third guide roller 77, and the pressing roller 78 are rotatably supported with their respective rotation axes being parallel to each other. The first guide roller 75 to the third guide roller 77 guide the wiper 23 in the path illustrated in FIG. 8 by guiding the wiper 23 wound therearound. The pressing roller 78 can press the wiper 23 against the liquid discharge head 21. The pressing roller 78 is biased upward by a spring (not illustrated), for example.

The feeding portion 71 rotatably holds the unused wiper 23 wound in a roll shape. When the feeding shaft 73 rotates, the feeding portion 71 unwinds and feeds the strip-shaped wiper 23. When the winding shaft 74 rotates, the winding portion 72 winds the wiper 23 into a roll shape.

The winding motor 79 rotates the feeding shaft 73 and the winding shaft 74 forward and backward in synchronization with each other. Feeding of the wiper 23 in the feeding direction Ds from the feeding portion 71 toward the winding portion 72 and feeding of the wiper 23 in a returning direction Dr from the winding portion 72 toward the feeding portion 71 are possible.

The pressing roller 78 can press the wiper 23 against the nozzle surface 21A. The liquid discharge head 21 of the present embodiment moves downstream in the sub-scanning direction Dy with respect to the wiping unit 22 in a state where the wiper 23 is pressed against the nozzle surface 21A, whereby the nozzle surface 21A is wiped. The wiping unit 22 wipes the nozzle surface 21A of the liquid discharge head 21 at a portion of the wiper 23 pressed by the pressing roller 78.

Replacement of Liquid

The liquid discharge apparatus 11 of the present embodiment uses the first liquid L1 having a sedimentation property superior to that of the second liquid L2. When the liquid discharge operation is not performed for a long period of time, a coloring material such as a pigment may be sedimented in the first liquid L1 in the supply flow path 59 coupling the liquid reservoir unit 19 and the nozzles 40. In this case, there is a possibility that the first liquid L1 may be sedimented to such an extent that the liquid discharge operation is adversely affected. The adverse effects include that printing is started in a state in which dispersion of the sedimented coloring material is insufficient even when the preparatory operation is performed at the initial stage of printing, printing defects are likely to occur at the initial stage of printing due to the insufficient dispersion, and the colors of printing are likely to be slightly different from the original colors.

The liquid discharge apparatus 11 of the present embodiment has a function of replacing the first liquid L1 with the second liquid L2 when the liquid discharge operation is not to be performed for a long period of time. The replacement of the first liquid L1 with the second liquid L2 takes place in a replacement mode. The replacement mode is selected when the liquid discharge operation is not to be performed for a long period of time.

In the replacement mode, the liquid in the supply flow path 59 is changed from the first liquid L1 to the second liquid L2. When the liquid replacement operation is performed, the power may be turned off while in the replacement mode. After the power is turned from the off state to the on state in order to perform the liquid discharge operation next time, a re-replacement mode is set so that the liquid in the supply flow path 59 is changed again from the second liquid L2 to the first liquid L1. Here, the re-replacement refers to inverse change from the second liquid L2 to the first liquid L1 in order to return to the original first liquid L1 from the second liquid L2 having replaced the first liquid L1 in the replacement mode.

In the example illustrated in FIGS. 3 and 4, the attachment unit 18 includes the first attachment portion 51 to which the first liquid reservoir unit 19A can be attached and a second attachment portion 52 to which the second liquid reservoir unit 19B can be attached. There is no difference in configuration between the first attachment portion 51 and the second attachment portion 52, and the first attachment portion 51 and the second attachment portion 52 are distinguished by whether the attached liquid reservoir unit 19 is the first liquid reservoir unit 19A or the second liquid reservoir unit 19B.

When the liquid discharge apparatus 11 is not used for a long period of time, there is a possibility that the first liquid L1 may be sedimented. The first liquid L1 contains color materials having a sedimentation property, such as pigments. When the coloring materials become sedimented, the first liquid L1 may exhibit an inappropriate color different from the original color, or the concentration of the coloring materials such as pigments in the first liquid L1 discharged from the first nozzles 41 may become low. In addition, when the color materials become sedimented, the fluidity of the first liquid L1 in the supply flow path 59 may be deteriorated by the sedimented color materials such as pigments, and the supply flow path 59 may be substantially clogged by the sedimented color materials. It may be difficult to remove the sedimented coloring materials. Therefore, when the power switch 32 is turned on next time and the use of the liquid discharge apparatus 11 is resumed, the first liquid L1 may not be appropriately discharged from the first nozzles 41 to cause a printing failure.

In order to restore the liquid discharge apparatus 11 to a usable state, it may be necessary to clean or replace the apparatus and the liquid discharge head, clean the supply flow path 59, or replace the supply tube or the like. Therefore, it is known that, when the liquid discharge apparatus 11 is not to be used for a long period of time, the supply flow path 59 extending from the first liquid reservoir unit 19A to the nozzles 40 is filled with a dedicated replacement liquid (dedicated liquid) to replace the first liquid L1 in the supply flow path 59 with the replacement liquid (anti-clogging liquid). Then, when the use of the liquid discharge apparatus 11 is resumed next time, re-replacement is performed such that the dedicated replacement liquid in the supply flow path 59 is replaced with the original first liquid L1, thereby resuming printing of the liquid discharge apparatus 11.

However, the dedicated replacement liquid has to be prepared separately from the liquid reservoir unit 19. That is, it is necessary to purchase and store a replacement liquid reservoir unit dedicated for reserving the replacement liquid separately from the liquid reservoir units 19A and 19B for reserving the liquid used for printing such as ink. It is also necessary to prepare an extra storage space to store the replacement liquid reservoir unit, and manage the replacement liquid reservoir unit separately from the liquid reservoir units 19A and 19B for printing so as not to attach the replacement liquid reservoir unit mistaking for the liquid reservoir units 19A and 19B. In addition, when the dedicated replacement liquid reservoir portion is out of stock, the replacement operation cannot be performed until the replacement liquid reservoir portion is obtained, and during that time, it may be necessary to take a sedimentation avoidance measure such as dummy printing in the liquid discharge apparatus 11 in order to avoid sedimentation of the first liquid L1.

Therefore, in the present embodiment, the second liquid L2 having a sedimentation property inferior to that of the first liquid L1 is used instead of the dedicated replacement liquid. The second liquid reservoir unit 19B that reserves the second liquid L2 having a sedimentation property inferior to that of the first liquid L1 or having no sedimentation property includes a plurality of types according to the types of the second liquid L2. In the present embodiment, the first liquid L1 is white ink. The white ink contains fine particles of titanium oxide as a pigment. The pigment may also be fine capsules. The dispersion medium of the pigment contains water as a main component. In the case of white ink, the specific gravities of coloring materials such as pigments are considerably larger than the specific gravity of water, as compared with ink of other colors. Therefore, the white ink has a sedimentation property superior to that of the ink of other colors. The dispersion medium of the first liquid L1 and the second liquid L2 may be a liquid other than water.

The second liquid L2 may be ink containing a pigment other than white as a coloring material, for example. Examples of the second liquid L2 include ink of cyan, magenta, and yellow. The coloring materials of the second liquid L2 may be pigments or dyes. In the present embodiment, clear ink is used as the second liquid L2. The clear ink is transparent and does not contain a coloring material. The clear ink has no sedimentation property. Therefore, when the first liquid L1 is replaced with the clear ink, color mixing is unlikely to occur. Using the clear ink makes the influence of color mixing small as compared with the case of using colored ink as the second liquid L2. For this reason, the clear ink is used as alternative ink to the replacement agent. In this case, when a small amount of the second liquid L2 remains in the first liquid L1 after re-replacement with the first liquid L1, there is no concern about color mixing even though the color (white) of the first liquid L1 may become light. Therefore, in the present embodiment, the clear ink is used as the second liquid L2 to replace the first liquid L1. The second liquid L2 that replaces the first liquid L1 may be colored ink of yellow, cyan, magenta, or the like. Even in the case of using the colored ink, the pigments are unlikely to become sedimented or do not become sedimented, so that it is possible to suppress the reduction or clogging of cross-sectional area of the supply flow path 59, which could occur with a liquid having a sedimentation property such as the first liquid L1, and it is also possible to suppress the clogging of the first nozzles 41.

Figure 11:
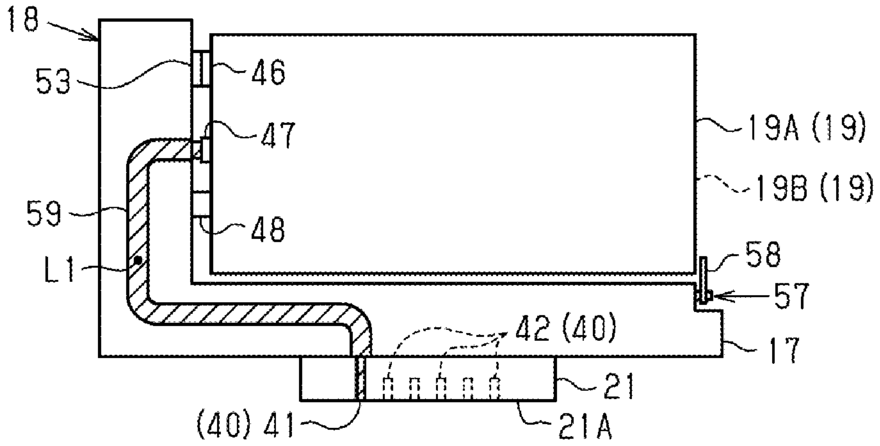
FIG. 11 is a schematic front sectional view of the attachment unit, illustrating a state in which a supply flow path communicating with first nozzles is filled with a first liquid.
Figure 18:
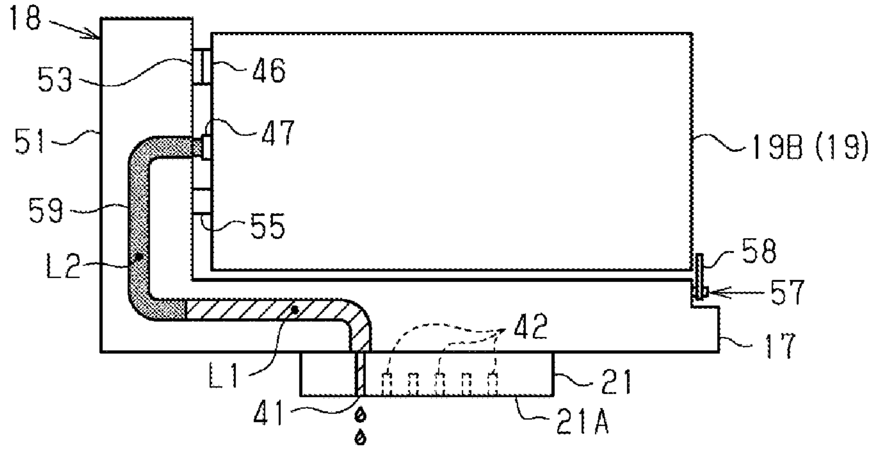
FIG. 18 is a schematic front sectional view of the attachment unit, illustrating a state in which a first liquid in the supply flow path communicating with the first nozzle is being replaced with a second liquid.

As illustrated in FIG. 11, in the first attachment portion 51 to which the first liquid reservoir unit 19A is attached, the supply flow path 59 communicating with the supply needle 55 is filled with the first liquid L1 up to the first nozzle 41. When the liquid discharge apparatus 11 is not used for a long period of time in this state, the coloring materials such as pigments in the first liquid L1 become sedimented. Therefore, in the liquid discharge apparatus 11 of the present embodiment, the replacement mode is prepared so as to be used when the liquid discharge apparatus 11 is not to be used for a long period of time. In the replacement mode, as illustrated in FIG. 18, the first liquid reservoir unit 19A attached to the first attachment portion 51 is reattached to the second liquid reservoir unit 19B. The second liquid L2 is fed from the upstream of the supply flow path 59 to push out the first liquid L1 in the supply flow path 59 from the first nozzle 41. In this way, the first liquid L1 in the supply flow path 59 and the first nozzle 41 is replaced with the second liquid L2. Since the second liquid L2 has a sedimentation property inferior to that of the first liquid L1, the second liquid L2 is unlikely to become sedimented even when the liquid discharge apparatus 11 is not used for a long period of time.

Figure 28:
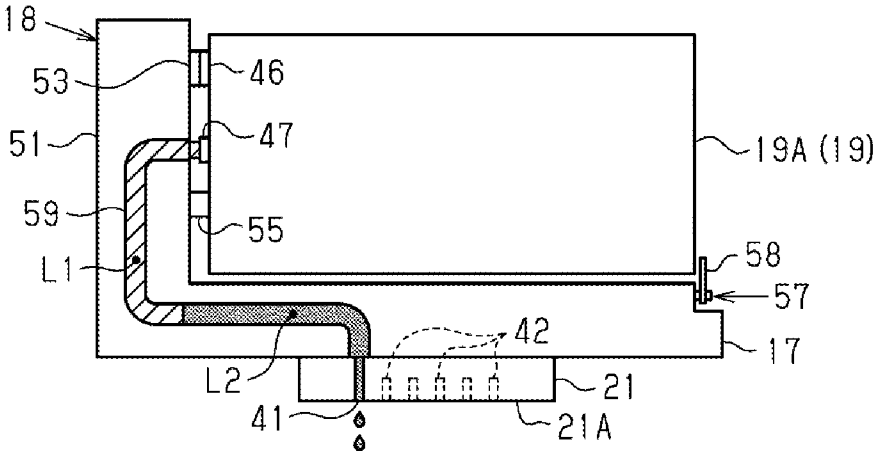
FIG. 28 is a schematic front sectional view of the attachment unit, illustrating a state in which the second liquid in the supply flow path communicating with the first nozzle is being replaced with the first liquid.
Figure 29:
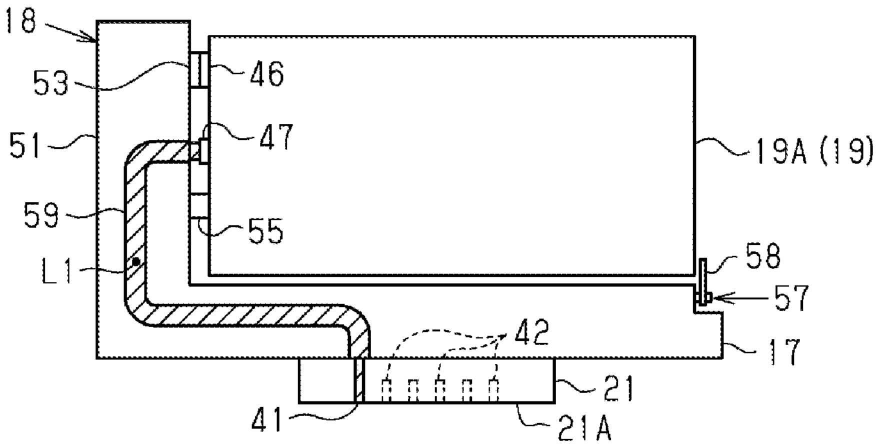
FIG. 29 is a schematic front sectional view of the attachment unit, illustrating a state in which the supply flow path communicating with the first nozzle is filled with the first liquid.

Further, when the use of the liquid discharge apparatus 11 is resumed after a long non-use period, it is necessary to re-replace the second liquid L2 in the supply flow path 59 and the first nozzle 41 of the first attachment portion 51 with the first liquid L1. Therefore, the re-replacement mode is prepared in the liquid discharge apparatus 11. In the re-replacement mode, as illustrated in FIG. 28, the first liquid reservoir unit 19A is attached to the first attachment portion 51. The first liquid L1 is fed from the upstream of the supply flow path 59 to push out the second liquid L2 in the supply flow path 59 from the first nozzle 41. In this way, the second liquid L2 in the supply flow path 59 and the first nozzle 41 is replaced with the first liquid L1 as illustrated in FIG. 29.

Here, the attachment unit 18 is devised in a shape in which only the correct liquid reservoir units 19A and 19B can be attached to the attachment portions 51 and 52. Both the attachment portions 51 and 52 and the liquid reservoir units 19A and 19B have concave-convex shapes that fit each other in a correct attachment combination and does not fit each other in a wrong attachment combination. In the present embodiment, it is necessary to attach the second liquid reservoir unit 19B to the first attachment portion 51 in the replacement mode.

Therefore, in the present embodiment, the shapes of these portions are devised so that the second liquid reservoir unit 19B reserving the clear ink can be attached to the first attachment portion 51 to which the first liquid reservoir unit 19A reserving the white ink is mounted. The reverse is not possible. That is, the first liquid reservoir unit 19A reserving the white ink cannot be attached to the second attachment portion 52. That is, the shapes of these portions are devised such that the second liquid reservoir unit 19B can be attached to the first attachment portion 51 to which the first liquid reservoir unit 19A is attached. As for the shapes, the second liquid reservoir unit 19B has a second concave-convex shape formed at the attachment surface, and the first attachment portion 51 has a first concave-convex shape formed thereat. The second concave-convex shape formed at the attachment surface of the second liquid reservoir unit 19B fits to the first concave-convex shape formed at the first attachment portion 51. Therefore, the second liquid reservoir unit 19B can be attached to the first attachment portion 51. On the other hand, the first concave-convex shape formed at the attachment surface of the first liquid reservoir unit 19A does not fit to the second concave-convex shape formed at the second attachment portion 52. Therefore, the first liquid reservoir unit 19A cannot be attached to the second attachment portion 52.

Electrical Configuration of Liquid Discharge Apparatus 11

Figure 9:
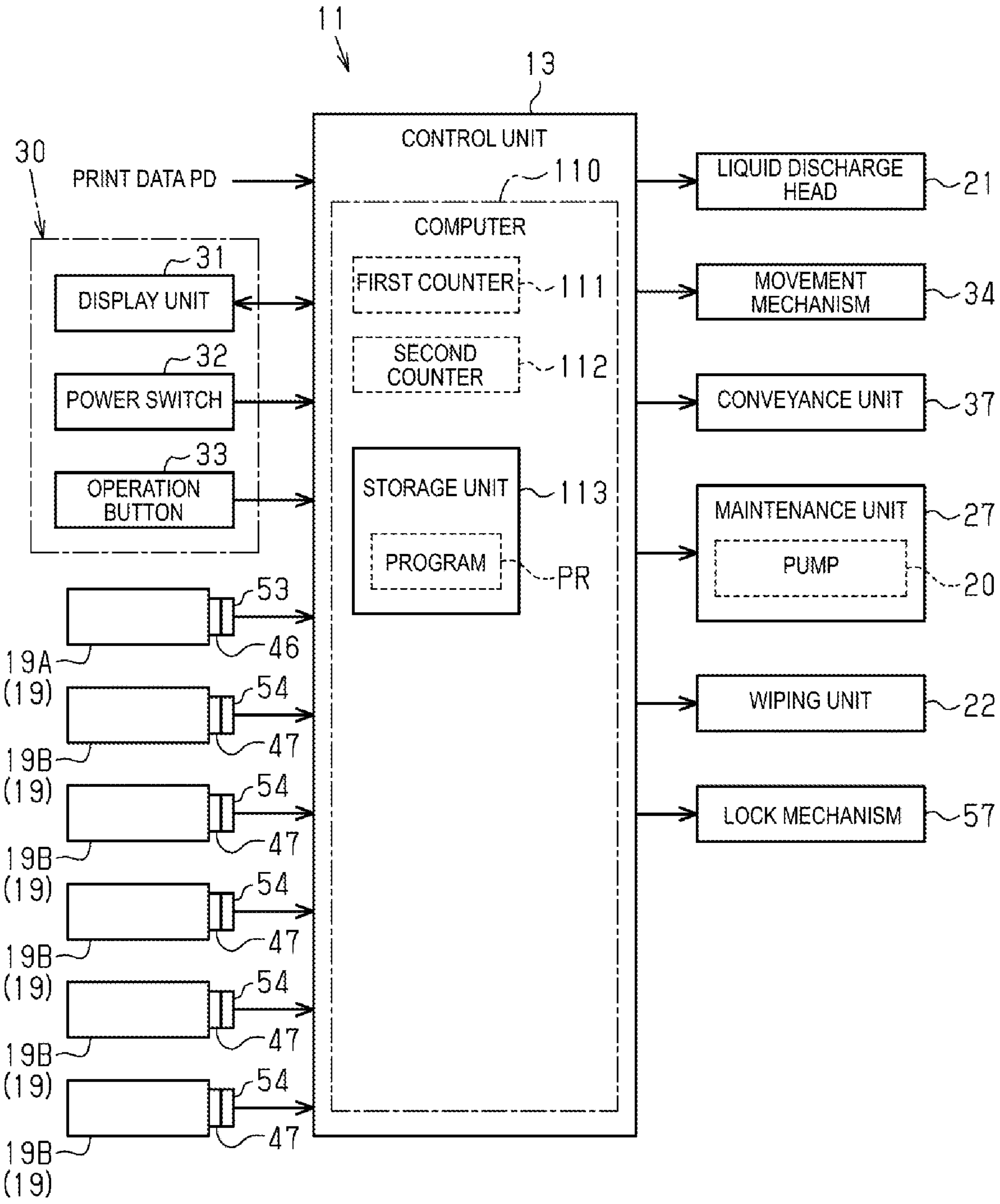
FIG. 9 is a block diagram illustrating an electrical configuration of the liquid discharge apparatus.

Next, an electrical configuration of the liquid discharge apparatus 11 will be described with reference to FIG. 9. The liquid discharge apparatus 11 receives print data PD from a host apparatus (not illustrated), for example. The print data PD includes print condition information and image data. The control unit 13 is electrically coupled to the operation unit 30, the first coupling portion 53, and the second coupling portion 54. The display unit 31, the power switch 32, and the operation button 33 that constitute the operation unit 30 are electrically coupled to the control unit 13.

The liquid discharge head 21, the movement mechanism 34, the conveyance unit 37, the maintenance unit 27, the wiping unit 22, and the lock mechanism 57 are electrically coupled to the control unit 13.

The control unit 13 controls the liquid discharge head 21 to perform printing control of discharging a liquid such as ink from the nozzles 40. The control unit 13 controls the movement mechanism 34 to control the movement of the carriage 17 in the scanning direction Dx and the movement of the carriage 17 in the sub-scanning direction Dy. The control unit 13 controls the conveyance unit 37 to convey the medium 16 in the sub-scanning direction Dy during or between printing. The conveyance unit 37 may be configured to relatively move the medium 16 supported by the support unit 15 in the sub-scanning direction Dy with respect to the liquid discharge head 21 by moving the support unit 15 in a direction parallel to the sub-scanning direction Dy.

The control unit 13 controls the maintenance unit 27 at a predetermined time. That is, the control unit 13 controls the pump 20 included in the maintenance unit 27 to eject the liquid from the nozzles 40 of the liquid discharge head 21. At this time, the control unit 13 moves the cap 25 constituting the maintenance unit 27 to a capping position, for example, which is a position at which the liquid is ejected from the nozzles 40. The pump 20 may be a pressure pump or a suction pump.

The control unit 13 also controls the wiping unit 22 to perform wiping control of wiping the nozzle surface 21A with the wiper 23. After ejecting the liquid from the nozzles 40, the control unit 13 wipes the nozzle surface 21A with the wiper 23. The control unit 13 controls the lock mechanism 57. The control unit 13 performs a lock operation of moving the lock member 58 constituting the lock mechanism 57 to the lock position and an unlock operation of moving the lock member 58 to the unlock position. The plurality of lock members 58 constituting the lock mechanism 57 can be individually controlled. Alternatively, the plurality of lock members 58 may be synchronously controlled.

The control unit 13 includes a computer 110. The computer 110 includes a central processing unit (CPU), a read only memory (ROM), a random access memory (RAM), and a storage, which are not illustrated. The control unit 13 controls conveyance of the medium 16 in the liquid discharge apparatus 11 and printing operation on the medium 16 by the liquid discharge head 21. Specifically, the control unit 13 is not limited to one that performs software processing for all processing executed by the control unit 13 itself. For example, the control unit 13 may include a dedicated hardware circuit (for example, an application-specific integrated circuit (ASIC)) executing hardware processing for at least part of the processing to be executed by the control unit 13 itself. That is, the control unit 13 may be configured as circuitry including one or more processors operating according to a computer program (software), one or more dedicated hardware circuits executing at least some of various processing operations, or a combination thereof. The processor includes a CPU and memories such as a RAM and a ROM, and the memories store program codes or commands for causing the CPU to perform processing. The memories, that is, computer-readable media, include any available media that can be accessed by the general purpose or special purpose computer 110.

The computer 110 includes a first counter 111, a second counter 112, and a storage unit 113. In the replacement mode, the first counter 111 counts a value corresponding to the amount of a liquid ejected from the first nozzles 41. That is, the first counter 111 counts a value corresponding to the amount of a liquid flowing through the supply flow path 59 in the replacement mode. In the re-replacement mode, the second counter 112 counts a value corresponding to the amount of a liquid ejected from the first nozzles 41. That is, the second counter 112 counts a value corresponding to the amount of a liquid flowing through the supply flow path 59 in the re-replacement mode.

The storage unit 113 stores programs PR. The programs PR include a program of a liquid management routine illustrated in the flowchart of FIG. 10. The programs PR also include at least one program of the re-replacement processing routines illustrated in FIGS. 20 to 22.

In the present embodiment, when the liquid discharge apparatus 11 is not to be used for a long period of time, the control unit 13 guides the work to be performed by the operator through display information displayed on the display unit 31 in performing the processing of replacing the first liquid L1 with the second liquid L2. The control unit 13 displays, on the display unit 31, display information related to a work procedure necessary for the operator to replace the liquid in the replacement mode. The control unit 13 also displays, on the display unit 31, display information related to a work procedure necessary for the operator to replace the liquid in the re-replacement mode.

Operations of First Embodiment

Next, operations of the liquid discharge apparatus 11 will be described.

Figure 10:
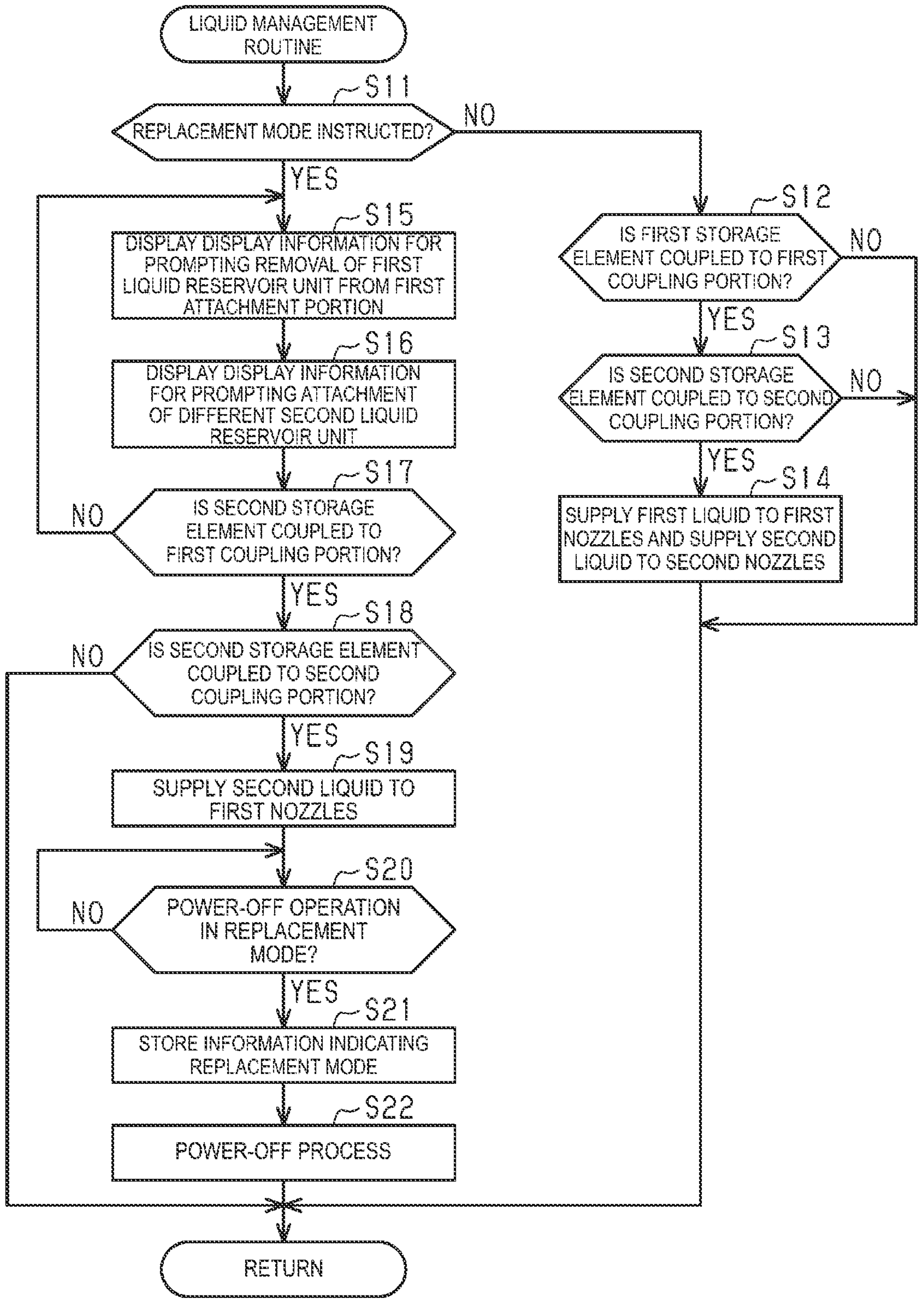
FIG. 10 is a flowchart of a liquid management routine.

The computer 110 constituting the control unit 13 of the liquid discharge apparatus 11 executes the liquid management routine illustrated in FIG. 10 while the power is on. This routine is intended to perform processing of managing the liquid in the supply system. In the present embodiment, the control unit 13 has, as modes for managing the liquid in the supply system, a normal mode in which there is a possibility of performing printing and a replacement mode for replacing the liquid when printing is not to be performed for a long period of time. The operator instructs the replacement mode when the liquid discharge apparatus 11 is not to be used for a long period of time.

Hereinafter, the liquid management routine will be described with reference to FIG. 10. Prior to description of the liquid management routine, FIGS. 11 to 19 will be referred to.

The liquid reservoir unit 19 attached to the attachment unit 18 is locked by the lock mechanism 57. Therefore, the operator cannot replace or remove the liquid reservoir unit 19 with respect to the attachment portions 51 and 52. When the control unit 13 determines that replacement or removal of the liquid reservoir unit 19 is to be permitted, the liquid reservoir unit 19 is released from the lock by the lock mechanism 57. Accordingly, the operator can replace the liquid reservoir unit 19.

Figure 12:
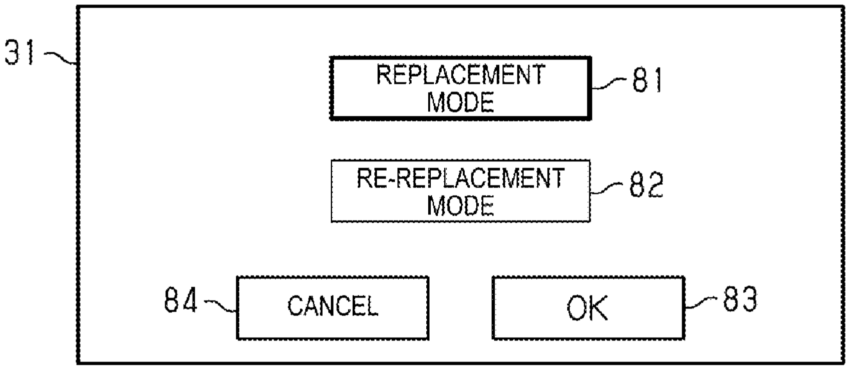
FIG. 12 is a schematic diagram illustrating an input screen for selecting a replacement mode displayed on a display unit.

While there is a possibility of using the liquid discharge apparatus 11 for printing, the liquid discharge apparatus 11 is set to the normal mode. On the other hand, when the liquid discharge apparatus 11 is not to be used for a long period of time, the operator operates the operation unit 30 to instruct the replacement mode. That is, the operator instructs replacement by using the operation button 33 or the touch panel function of the display unit 31. For example, the operator operates the operation unit 30 to display the input screen illustrated in FIG. 12 on the display unit 31. As illustrated in FIG. 12, the input screen includes a replacement instruction button 81, a re-replacement instruction button 82, an OK button 83, and a cancel button 84. The operator selects and operates the replacement instruction button 81 by operating the operation unit 30. Upon receiving the replacement instruction, the control unit 13 switches from the normal mode to the replacement mode. In the replacement mode, the control unit 13 performs liquid replacement processing of replacing the first liquid L1 in the supply flow path 59 from the first attachment portion 51 to the first nozzle 41 with the second liquid L2.

First, in step S11, the computer 110 determines whether the replacement mode has been instructed. When performing the liquid replacement processing, the operator instructs execution of the replacement mode through operation of the operation unit 30. If the replacement mode is instructed, the computer 110 proceeds to step S15. If the replacement mode is not instructed, the computer 110 proceeds to step S12.

When a negative determination is made in step S11, the processing in the normal mode is performed in steps S12 to S14. On the other hand, when an affirmative determination is made in step S11, the computer 110 executes the replacement mode in steps S15 to S22. First, the normal mode will be described.

In step S12, the computer 110 determines whether the first storage element 46 is coupled to the first coupling portion 53. When the first storage element 46 is coupled to the first coupling portion 53, the processing proceeds to step S13. When the first storage element 46 is not coupled to the first coupling portion 53, there is an anomaly such as defective attachment of the first liquid reservoir unit 19A, and thus the routine is ended. In this case, an anomaly processing routine (not illustrated) is started, and display information for prompting re-attachment of the first liquid reservoir unit 19A defectively coupled is displayed on the display unit.

In step S13, the computer 110 determines whether the second storage element 47 is coupled to the second coupling portion 54. When the second storage element 47 is coupled to the second coupling portion 54, the processing proceeds to step S14. When the second storage element 47 is not coupled to the second coupling portion 54, there is an anomaly such as defective attachment of the second liquid reservoir unit 19B, and thus the routine is ended. In this case, an anomaly processing routine (not illustrated) is started, and display information for prompting re-attachment of the second liquid reservoir unit 19B defectively coupled is displayed on the display unit.

In step S14, the computer 110 performs an operation of supplying the first liquid L1 to the first nozzles 41 and an operation of supplying the second liquid L2 to the second nozzles 42. That is, each liquid is supplied to the corresponding nozzles 40 so that the liquid discharge head 21 can perform printing. In this case, when each liquid has already been supplied to the corresponding nozzles 40, the liquid supply operation is not performed. That is, since step S14 is processing of supplying the liquid to the corresponding nozzles 40 when necessary, the liquid supplying operation is not performed unnecessarily.

Figure 13:
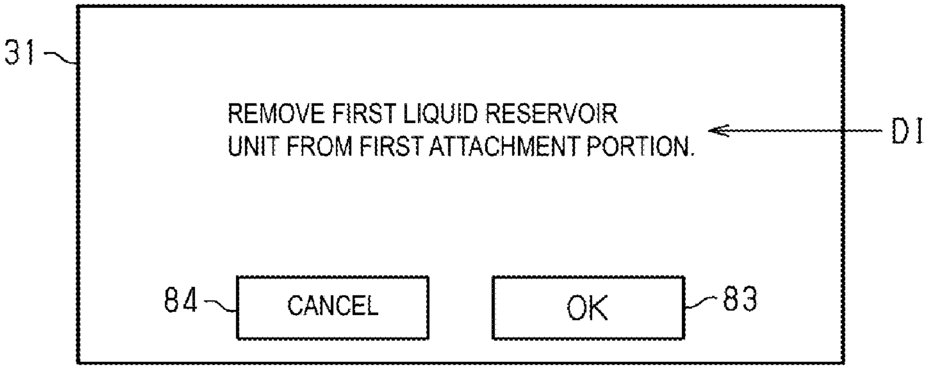
FIG. 13 is a schematic view of a display unit that displays display information for prompting removal of a first liquid reservoir unit.
Figure 14:
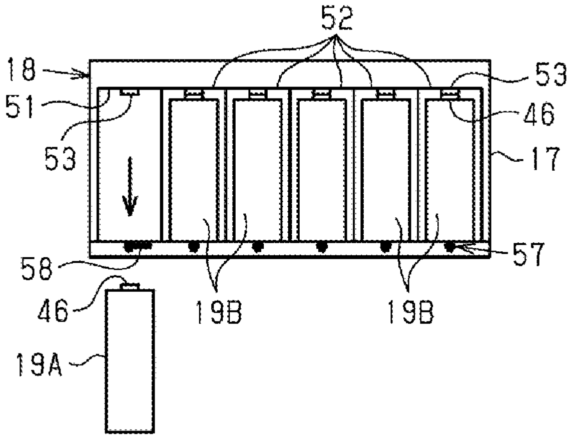
FIG. 14 is a schematic plan view illustrating a state in which the first liquid reservoir unit is being removed.

In next step S15, the computer 110 displays display information for prompting removal of the first liquid reservoir unit 19A from the first attachment portion 51. As illustrated in FIG. 13, for example, a message "Remove the first liquid reservoir unit from the first attachment portion" is displayed as display information DI on the display unit 31. At this time, the computer 110 controls the lock mechanism 57 to move the lock member 58 to the unlock position, thereby allowing the operator to remove the first liquid reservoir unit 19A. As illustrated in FIG. 14, the operator removes the first liquid reservoir unit 19A from the first attachment portion 51.

Figure 15:
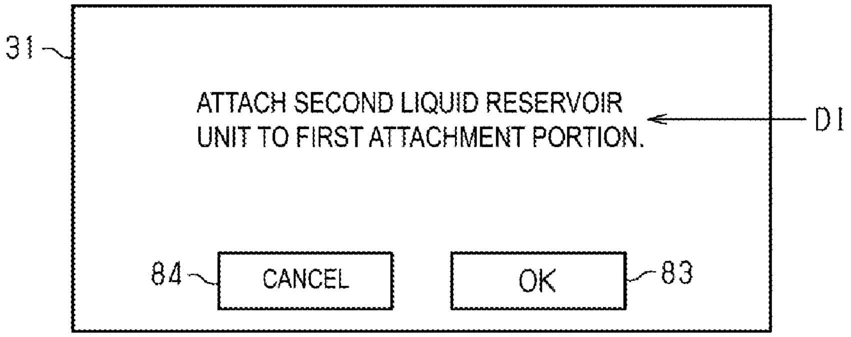
FIG. 15 is a schematic view of the display unit that displays display information for prompting attachment of a second liquid reservoir unit.
Figure 16:
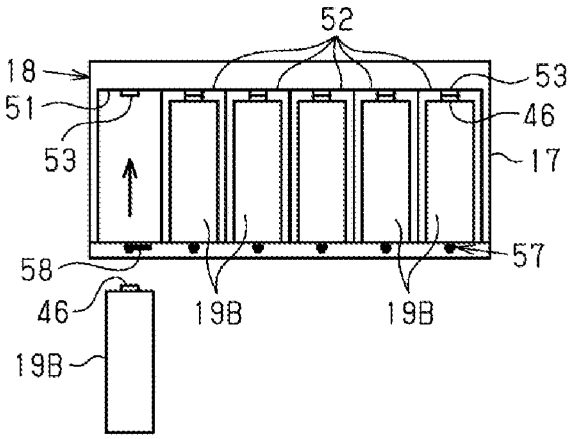
FIG. 16 is a schematic plan view illustrating a state in which the second liquid reservoir unit is being attached to a first attachment portion.
Figure 17:
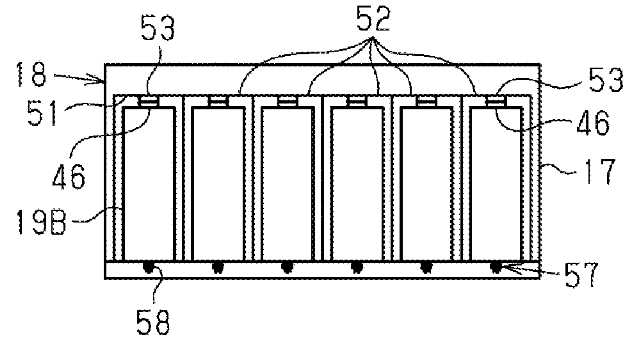
FIG. 17 is a schematic plan view of the attachment unit in which the second liquid reservoir unit is attached to the first attachment portion.

In step S16, the computer 110 displays, on the display unit 31, the display information DI for prompting attachment of a different second liquid reservoir unit 19B to the first attachment portion 51. As illustrated in FIG. 15, the computer 110 displays, on the display unit 31, a message "Attach the second liquid reservoir unit to the first attachment portion" as display information DI, for example. As illustrated in FIG. 16, the operator attaches a different second liquid reservoir unit 19B to the first attachment portion 51. As a result, as illustrated in FIG. 17, the operator attaches the second liquid reservoir unit 19B to the first attachment portion 51. Here, the different second liquid reservoir unit 19B refers to a second liquid reservoir unit 19B that is different from the second liquid reservoir unit 19B attached to the second attachment portion 52. For example, a spare second liquid reservoir unit 19B is used as a different second liquid reservoir unit 19B. In the present embodiment, among the second liquid reservoir units 19B, the second liquid reservoir unit 19B that reserves clear ink as the second liquid L2 is used as a different second liquid reservoir unit 19B. This is because even when there is color mixing in which the second liquid L2 slightly remains in the first liquid L1 at the time of re-replacement, the color of the first liquid L1 is not significantly affected. The second liquid reservoir unit 19B that reserves any one type of ink of cyan, magenta, yellow, and black as the second liquid L2 may be used as a different second liquid reservoir unit 19B.

In next step S17, the computer 110 determines whether the second storage element 47 is coupled to the first coupling portion 53. When the second storage element 47 is coupled to the first coupling portion 53, the processing proceeds to step S18. On the other hand, when the second storage element 47 is not coupled to the first coupling portion 53, the processing returns to step S15, and the operation of attaching the second liquid reservoir unit 19B to the first attachment portion 51 is redone. That is, when the first liquid reservoir unit 19A to be attached to the first attachment portion 51 is not attached and the incorrect second liquid reservoir unit 19B is attached, the operator is caused to perform again the operation of attaching the first liquid reservoir unit 19A to the first attachment portion 51. When the correct coupling cannot be confirmed even after the operation is re-performed a predetermined number of times, the routine may be ended.

In next step S18, the computer 110 determines whether the second storage element 47 is coupled to the second coupling portion 54. When the second storage element 47 is coupled to the second coupling portion 54, the processing proceeds to step S19. On the other hand, when the second storage element 47 is not coupled to the second coupling portion 54, the routine is ended. That is, even though the second liquid reservoir unit 19B is attached to the first attachment portion 51, when an object other than the second liquid reservoir unit 19B is attached to the second attachment portion or the second liquid reservoir unit 19B is defectively attached, the routine is ended. In this case, the computer 110 activates an anomaly processing routine (not illustrated), and displays, on the display unit 31, display information (not illustrated) prompting correct attachment of the second liquid reservoir unit 19B to the second attachment portion. Then, the computer 110 inputs an operation signal indicating that the second liquid reservoir unit 19B has been attached to the second attachment portion, and the processing returns to step S18 described above.

In next step S19, the computer 110 supplies the second liquid L2 to the first nozzles 41. That is, the computer 110 supplies the second liquid L2 to the nozzles 41 (first nozzles 41) that discharge the first liquid L1. Specifically, the computer 110 drives the pump 20 to eject the first liquid L1 from the first nozzles 41 by pressurization or suction. In the case of pressurization, the second liquid L2 is pressurized and supplied from the second liquid reservoir unit 19B to the first nozzles 41. On the other hand, in the case of suction, when the first liquid L1 is sucked and ejected from the first nozzles 41, the second liquid L2 is drawn into the supply flow path 59 from the second liquid reservoir unit 19B by the suction force.

Figure 19:
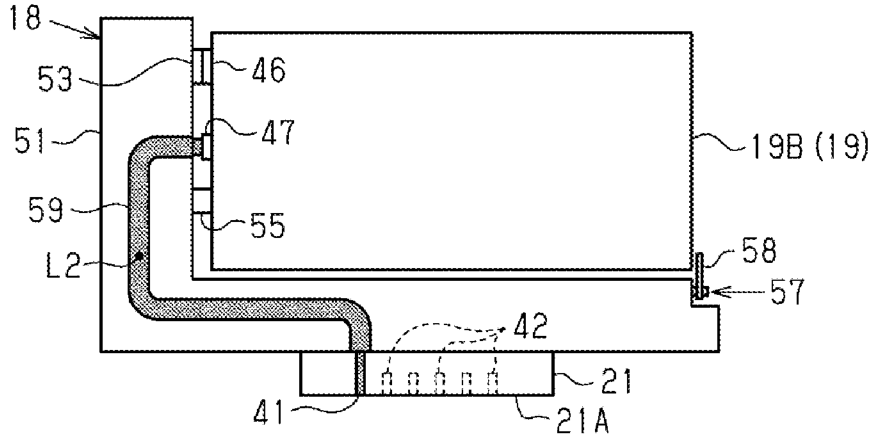
FIG. 19 is a schematic front sectional view of the attachment unit, illustrating a state in which the supply flow path communicating with the first nozzle is filled with the second liquid.

As illustrated in FIG. 18, when the second liquid L2 is supplied from the second liquid reservoir unit 19B toward the liquid discharge head 21, in the supply flow path 59 from the second liquid reservoir unit 19B to the first nozzles 41, the first liquid L1 is pushed and ejected from the first nozzles 41 by the second liquid L2 supplied from upstream. Thus, as illustrated in FIG. 19, the supply flow path 59 communicating with the first nozzles 41 is filled with the second liquid L2. When the second liquid L2 is clear ink, for example, the supply flow path 59 communicating with the first nozzles 41 and the first nozzles 41 are filled with the clear ink. In this manner, the first liquid L1 is replaced with the second liquid L2. Therefore, even when the liquid discharge apparatus 11 is not used for a long period of time thereafter, the sedimentation of the coloring materials such as the pigments in the ink does not occur in the first nozzles 41 and the supply flow path 59.

In next step S20, the computer 110 determines whether a power-off operation has been performed while in the replacement mode. When the replacement of the first liquid L1 with the second liquid L2 is completed, the operator operates the power switch 32 to shut off the power supply to the liquid discharge apparatus 11. At this time, the liquid discharge apparatus 11 is in the replacement mode. Therefore, when the operation signal of the power switch 32 is input, the computer 110 determines that the power-off operation has been performed while in the replacement mode.

In next step S21, the computer 110 stores information indicating the replacement mode. Specifically, the computer 110 writes information indicating the replacement mode in a predetermined storage area of the storage unit 113. The storage unit 113 includes a rewritable nonvolatile memory such as a flash memory, for example, and stores information even in the power-off state.

In next step S22, the computer 110 performs the power-off processing. That is, the computer 110 turns off a switch element of a power supply device (not illustrated) to shut off the power supply to the liquid discharge apparatus 11.

Thus, the liquid discharge apparatus 11 will not be used for a long period of time. Therefore, since the first nozzles 41 that discharge the first liquid L1 and the supply flow path 59 communicating with the first nozzles 41 are filled with the second liquid L2, sedimentation does not occur. In particular, when the replacement second liquid L2 is clear ink, sedimentation hardly occurs because the ink does not contain a coloring material.

Thereafter, when the use of the liquid discharge apparatus 11 that has not been used for a long period of time is resumed, the second liquid L2 in the supply flow path 59 communicating with the first nozzles 41 is re-replaced with the first liquid L1. The control unit 13 informs the operator of what should be done in performing the re-replacement.

Figure 20:
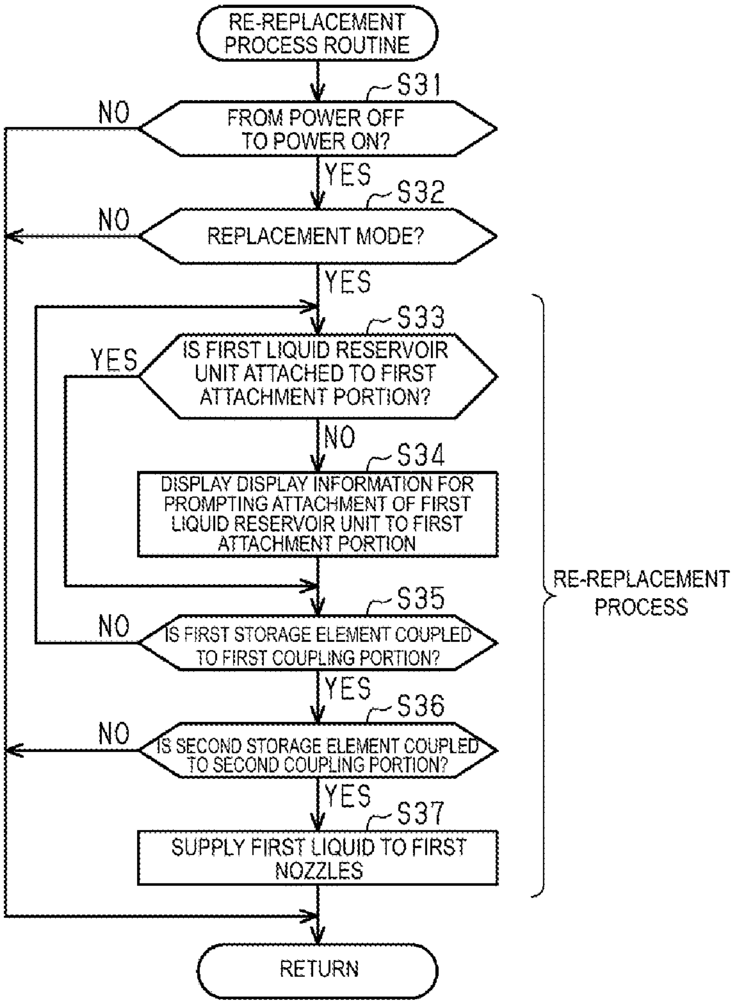
FIG. 20 is a flowchart of re-replacement processing routine.

Next, the re-replacement processing will be described with reference to FIGS. 20 to 22.

There are three methods for the re-replacement processing. For the first method, when the liquid discharge apparatus 11 has been powered off while in the replacement mode, the re-replacement processing is performed on condition that the liquid discharge apparatus 11 is switched from the power-off state to the power-on state. In this case, it is determined whether the replacement mode is set when the liquid discharge apparatus 11 is switched from the power-off state to the power-on state, and when the replacement mode is set, the re-replacement processing is performed. For example, steps S31 and S32 in FIG. 20 correspond to the processing of determining whether the replacement mode is set when the liquid discharge apparatus 11 is switched from the power-off state to the power-on state. In this case, when it is determined in step S32 that the replacement mode is set, the re-replacement processing is performed.

Figure 23:
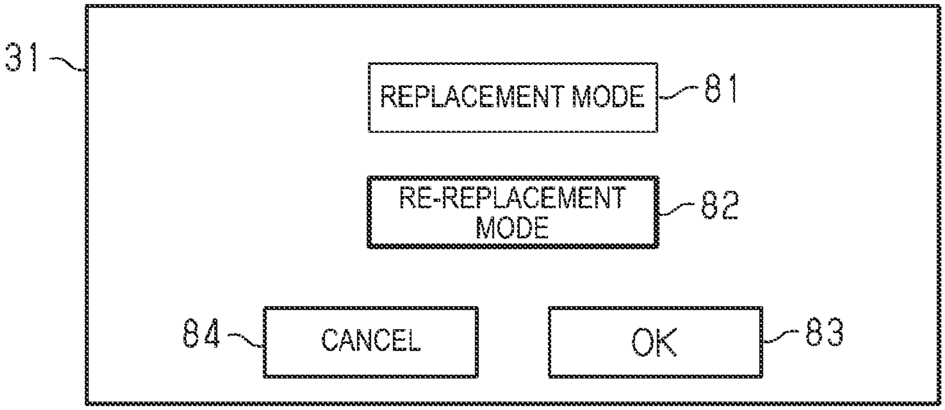
FIG. 23 is a schematic diagram illustrating an input screen for selecting a re-replacement mode displayed on the display unit.

For the second method, when the operator operates the operation unit 30 to input instruction of re-replacement, the re-replacement processing is performed. For example, the operator operates the operation unit 30 to display an input screen on the display unit 31 as illustrated in FIG. 23, and selects and operates the re-replacement instruction button 82 on the input screen to instruct re-replacement. For example, step S41 in FIG. 21 corresponds to the processing of determining whether the instruction of re-replacement has been input. In this case, when it is determined in step S41 that the instruction of re-replacement has been input, the re-replacement processing is performed.

For the third method, after the liquid discharge apparatus 11 was switched from the power-off state to the power-on state, when printing using the first liquid L1 is instructed, the re-replacement operation is performed. For example, steps S51 and S52 in FIG. 22 correspond to the processing of determining whether printing using the first liquid L1 is instructed when the liquid discharge apparatus 11 is switched from the power-off state to the power-on state. In this case, when it is determined in step S52 that printing using the first liquid L1 is instructed, the re-replacement processing is performed.

These three methods are different from each other in determination conditions for starting the re-replacement. Even though the determination conditions are different, the re-replacement processing to be performed when the determination conditions are satisfied is common. In any of the methods, the control unit 13 performs the re-replacement processing as in steps S33 to S37 in FIG. 20.

Hereinafter, re-replacement processing routine for performing the re-replacement processing when a first determination condition as an example is satisfied will be described with reference to FIG. 20.

First, in step S31, the computer 110 determines whether the power has been turned from off to on. If the power has been turned from off to on, the processing proceeds to step S32. If the power has not been turned from off to on (for example, including when the power is on), the routine is ended.

In step S32, the computer 110 determines whether the replacement mode is set. The computer 110 determines whether the replacement mode is set, based on the information read from the predetermined storage area of the storage unit 113. That is, the computer 110 determines whether the replacement mode is set, based on the information that was written in the predetermined storage area of the storage unit 113 when the replacement mode was set during the previous power-off time.

In next step S33, the computer 110 determines whether the first liquid reservoir unit 19A is attached to the first attachment portion 51. When the first liquid reservoir unit 19A is attached to the first attachment portion 51, the processing proceeds to step S35, and when the first liquid reservoir unit 19A is not attached to the first attachment portion 51, the processing proceeds to step S34.

Figure 24:
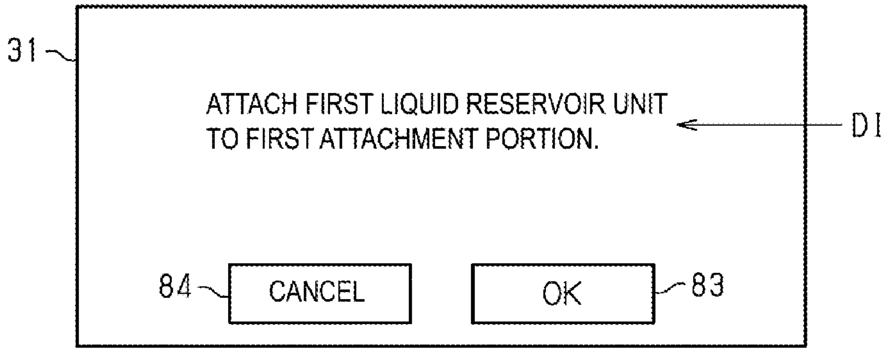
FIG. 24 is a schematic diagram illustrating the display unit that displays display information for prompting attachment of the first liquid reservoir unit to the first attachment portion.
Figure 25:
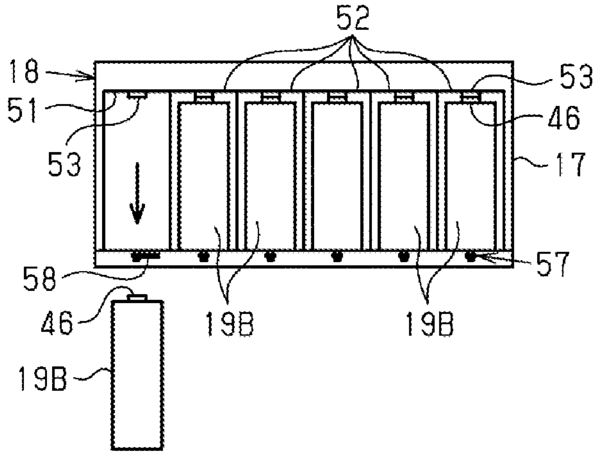
FIG. 25 is a schematic plan view illustrating a state in which the second liquid reservoir unit is being removed from the first attachment portion.
Figure 26:
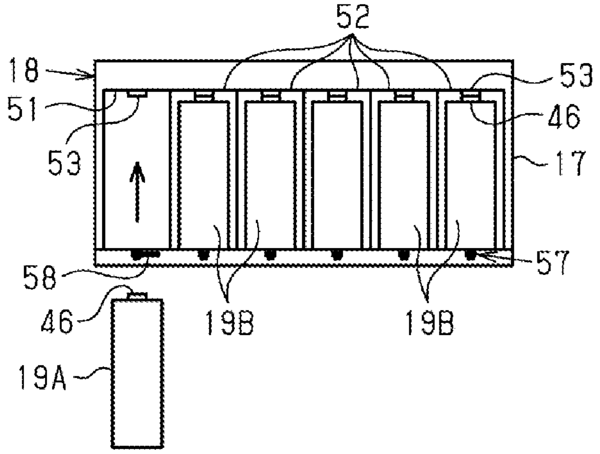
FIG. 26 is a schematic plan view illustrating a state in which the first liquid reservoir unit is being attached to the first attachment portion.
Figure 27:
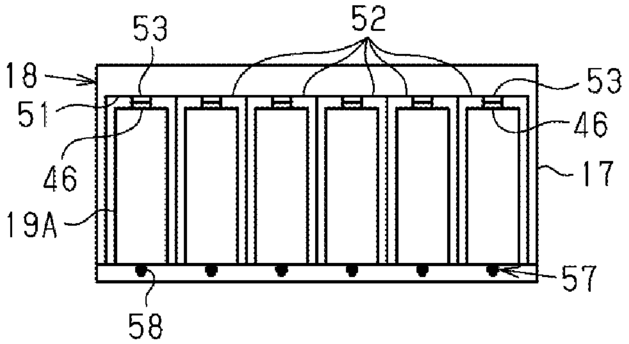
FIG. 27 is a schematic plan view of the attachment unit in which the first liquid reservoir unit is attached to the first attachment portion.

In step S34, the computer 110 displays, on the display unit 31, display information for prompting attachment of the first liquid reservoir unit 19A to the first attachment portion 51. For example, as illustrated in FIG. 24, the computer 110 causes the display unit 31 to display the display information DI "Attach the first liquid reservoir unit to the first attachment portion". The operator who has seen the display information DI removes the second liquid reservoir unit 19B from the first attachment portion 51 as illustrated in FIG. 25, and then attaches the first liquid reservoir unit 19A to the first attachment portion 51 as illustrated in FIG. 26. As illustrated in FIG. 27, when the attachment of the first liquid reservoir unit 19A to the first attachment portion 51 is completed and the first storage element 46 and the first coupling portion 53 are coupled, the operator operates the OK button 83 on the display unit 31 illustrated in FIG. 24.

In step S35, the computer 110 determines whether the first storage element 46 is coupled to the first coupling portion 53. When the first storage element 46 is coupled to the first coupling portion 53, the processing proceeds to step S36, and when the first storage element 46 is not coupled to the first coupling portion 53, the processing returns to step S33. In this case, since a negative determination is made in step S33, step S34 is performed. For example, as illustrated in FIG. 24, the computer 110 causes the display unit 31 to display again the display information DI "Attach the first liquid reservoir unit to the first attachment portion".

In step S36, the computer 110 determines whether the second storage element 47 is coupled to the second coupling portion 54. When the second storage element 47 is coupled to the second coupling portion 54, the processing proceeds to step S37, and when the second storage element 47 is not coupled to the second coupling portion 54, the routine is ended. That is, even though the first liquid reservoir unit 19A is attached to the first attachment portion 51, when an object other than the second liquid reservoir unit 19B is attached to the second attachment portion or the second liquid reservoir unit 19B is defectively attached, the routine is ended. In this case, the computer 110 activates an anomaly processing routine (not illustrated), and displays, on the display unit 31, display information (not illustrated) prompting correct attachment of the second liquid reservoir unit 19B to the second attachment portion. Then, the computer 110 inputs an operation signal indicating that the second liquid reservoir unit 19B has been attached to the second attachment portion, and the processing returns to step S36 described above.

In next step S37, the computer 110 supplies the first liquid L1 to the first nozzles 41. That is, the computer 110 supplies the first liquid L1 to the nozzles 41 (first nozzles 41) that discharge the first liquid L1. Specifically, the computer 110 drives the pump 20 to supply the first liquid L1 to the first nozzles 41 by pressurization or suction. In the case of pressurization, the first liquid L1 is pressurized and supplied from the first liquid reservoir unit 19A to the first nozzles 41. On the other hand, in the case of suction, when the second liquid L2 is sucked and ejected from the first nozzles 41, the first liquid L1 is drawn into the supply flow path 59 from the first liquid reservoir unit 19A by suction force.

As illustrated in FIG. 28, when the first liquid L1 is supplied from the first liquid reservoir unit 19A toward the liquid discharge head 21, the second liquid L2 is pushed and ejected from the first nozzles 41 by the first liquid L1 supplied from the upstream in the supply flow path 59. Thus, as illustrated in FIG. 29, the supply flow path 59 communicating with the first nozzles 41 is filled with the first liquid L1. In this manner, the second liquid L2 is replaced with the first liquid L1 by the re-replacement. When the first liquid L1 is white ink, for example, the supply flow path 59 communicating with the first nozzles 41 and the first nozzles 41 are filled with the white ink. Therefore, the liquid discharge apparatus 11 can perform printing using the white ink.

Figure 21:
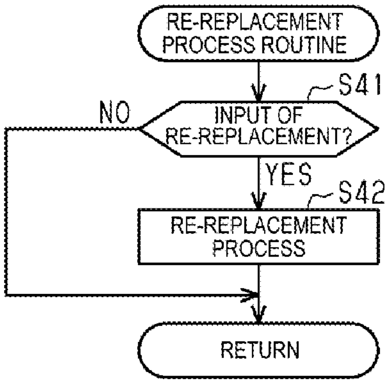
FIG. 21 is a flowchart of re-replacement processing routine different from that in FIG. 20.

Furthermore, as illustrated in FIG. 21, in the routine of performing the re-replacement processing when the second determination condition is satisfied, the processing is performed as described below. For example, the operator displays the input screen illustrated in FIG. 23 on the display unit 31, and operates the operation unit 30 to select and operate the re-replacement instruction button 82 on the input screen. Accordingly, re-replacement is instructed. For example, step S41 in FIG. 21 corresponds to the processing of determining whether the instruction of re-replacement has been input. When the computer 110 determines in step S41 that the instruction of re-replacement has been input, the computer 110 performs the re-replacement processing in step S42. The re-replacement processing is similar to the processing in steps S33 to S37 in FIG. 20.

Figure 22:
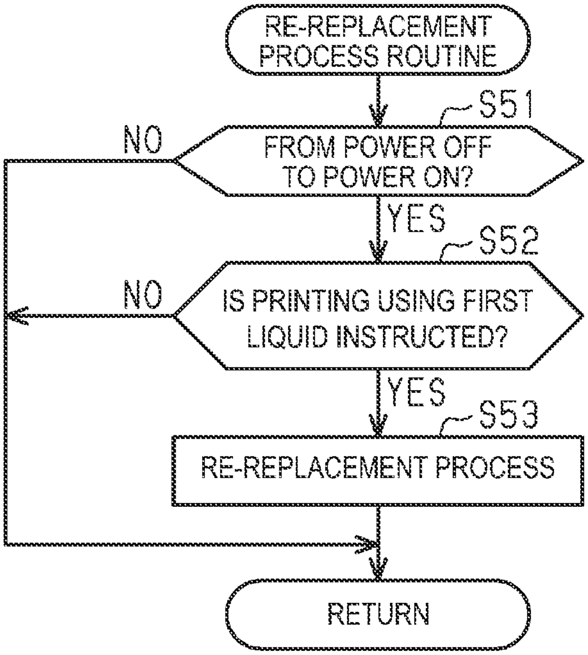
FIG. 22 is a flowchart of re-replacement processing routine different from that in FIG. 21.

Furthermore, as illustrated in FIG. 22, in the routine of performing the re-replacement processing when the third determination condition is satisfied, the processing is performed as described below. For example, in step S51 in FIG. 22, the computer 110 determines whether the power supply to the liquid discharge apparatus 11 has been switched from off to on. When the power supply to the liquid discharge apparatus 11 has been switched from off to on, the processing proceeds to step S52, and when the power supply to the liquid discharge apparatus 11 has not been switched from off to on, the processing proceeds to step S53.

In step S52, the computer 110 determines whether printing using the first liquid L1 has been instructed. If printing using the first liquid L1 has been instructed, the processing proceeds to step S53, and if printing using the first liquid L1 has not been instructed, the routine is ended.

In step S53, the computer 110 performs the re-replacement processing. In this manner, when printing using the first liquid L1 has been instructed when the power was switched from off to on, the computer 110 performs the re-replacement processing. The re-replacement processing is similar to the processing in steps S33 to S37 in FIG. 20.

Advantageous Effects of First Embodiment

According to the first embodiment, the following advantageous effects can be obtained.

(1) The liquid discharge apparatus 11 includes the liquid discharge head 21 that has the plurality of nozzles 41 and 42 and discharges a liquid from the nozzles 41 and 42 to perform printing on the medium 16, the attachment unit 18 to which the plurality of liquid reservoir units 19A and 19B reserving a liquid to be supplied to the plurality of nozzles 41 and 42 can be attached, and the operation unit 30 including the display unit 31. The attachment unit 18 includes the first attachment portion 51 to which the first liquid reservoir unit 19A that reserves the first liquid L1 having a sedimentation property is attached, and the second attachment portion 52 to which the second liquid reservoir unit 19B that reserves the second liquid L2 having a sedimentation property inferior to that of the first liquid L1 is attached. The control method of the liquid discharge apparatus 11 includes the following steps (1*a*) to (1*c*). (1*a*) In a case in which the execution of the replacement mode is instructed through the operation of the operation unit 30, displaying, on the display unit 31, display information for prompting removal of the first liquid reservoir unit 19A from the first attachment portion 51 (step S15). (1*b*) Displaying, on the display unit 31, display information for prompting attachment of a second liquid reservoir unit 19B different from the second liquid reservoir unit 19B attached to the second attachment portion 52, to the first attachment portion 51 (step S16). (1*c*) When the different second liquid reservoir unit 19B is attached to the first attachment portion 51, supplying the second liquid L2 to the plurality of nozzles 41 that discharge the first liquid L1 (step S19).

According to this method, in the replacement mode that is selected when the liquid discharge operation is not to be performed for a long period of time, the first liquid L1 having a sedimentation property is replaced with the second liquid L2 (liquid used for other printing) having a sedimentation property inferior to that of the first liquid L1, whereby it is possible to suppress clogging and discharge failure of the nozzles 41 while reducing the cost and space for preparing a dedicated replacement liquid. It is considered that the liquid discharge operation is not to be performed for a long period of time during storage and transportation of the apparatus and the liquid discharge head 21, while the discharge of the liquid discharge head 21 is suspended, or the like.

(2) The first liquid reservoir unit 19A includes the first storage element 46 that stores information of the first liquid reservoir unit 19A. The second liquid reservoir unit 19B includes the second storage element 47 that stores information of the second liquid reservoir unit 19B. The first attachment portion 51 includes the first coupling portion 53 that is electrically coupled to the first storage element 46. The second attachment portion 52 includes the second coupling portion 54 that is electrically coupled to the second storage element 47. In the control method of the liquid discharge apparatus 11, in a normal state, it is determined that the liquid discharge apparatus 11 is operable when the first storage element 46 of the first liquid reservoir unit 19A is coupled to the first coupling portion 53 and the second storage element 47 of the second liquid reservoir unit 19B is coupled to the second coupling portion 54. In the replacement mode, it is determined that the liquid discharge apparatus 11 is operable when the second storage element 47 of the second liquid reservoir unit 19B is coupled to the first coupling portion 53 and the second storage element 47 of the second liquid reservoir unit 19B is coupled to the second coupling portion 54. According to this method, the second liquid L2 in the second liquid reservoir unit 19B attached to the first attachment portion 51 is made usable only in the replacement mode, so that it is possible to prevent the second liquid L2 from being erroneously used in the normal state.

(3) The control method of the liquid discharge apparatus 11 includes the following steps (3*a*) to (3*c*). (3*a*) When the liquid discharge apparatus 11 is powered off while in the replacement mode, after the power supply to the liquid discharge apparatus 11 is switched from the off state to the on state, determining whether the first liquid reservoir unit 19A is attached to the first attachment portion 51 (steps S31 to S33). (3*b*) If it is determined that the first liquid reservoir unit 19A is not attached to the first attachment portion 51, displaying, on the display unit 31, display information for prompting attachment of the first liquid reservoir unit 19A to the first attachment portion 51 (step S34). (3*c*) If it is determined that the first liquid reservoir unit 19A is attached to the first attachment portion 51, the first liquid L1 is supplied to the plurality of nozzles 41 that discharge the first liquid L1 (steps S35 and S37). According to this method, when the liquid discharge apparatus 11 is restored, the operation of recharging the first liquid L1 is automatically performed, whereby it is possible to save time and improve workability.

(4) The control method of the liquid discharge apparatus 11 includes the following steps (4*a*) to (4*c*). (4*a*) When the execution of the re-replacement mode is instructed through the operation of the operation unit 30, determining whether the first liquid reservoir unit 19A is attached to the first attachment portion 51 (steps S41 and S33). (4*b*) If it is determined that the first liquid reservoir unit 19A is not attached to the first attachment portion 51, displaying, on the display unit 31, display information for prompting attachment of the first liquid reservoir unit 19A to the first attachment portion 51 (step S34). (4*c*) If it is determined that the first liquid reservoir unit 19A is attached to the first attachment portion 51, the first liquid L1 is supplied to the plurality of nozzles 41 that discharge the first liquid L1 (steps S35 and S37). According to this method, it is possible to prevent nozzle clogging by maintaining the replacement state by performing the operation of recharging only when the re-replacement mode is selected.

(5) The control method of the liquid discharge apparatus 11 includes the following steps (5*a*) to (5*c*). (5*a*) After the power supply to the liquid discharge apparatus 11 is switched from the off state to the on state, in the case of using the first liquid L1 for printing, determining whether the first liquid reservoir unit 19A is attached to the first attachment portion 51. (5*b*) If it is determined that the first liquid reservoir unit 19A is not attached to the first attachment portion 51, displaying, on the display unit 31, display information for prompting attachment of the first liquid reservoir unit 19A to the first attachment portion 51. (5*c*) If it is determined that the first liquid reservoir unit 19A is attached to the first attachment portion 51, the first liquid L1 is supplied to the plurality of nozzles 41 that discharge the first liquid L1. According to this method, it is possible to prevent nozzle clogging and discharge failure by maintaining the replacement state until the first liquid L1 is used. In the case of using the first liquid L1 for printing, the operation of recharging the first liquid L1 is automatically performed, whereby it is possible to save time and improve workability.

(6) The liquid discharge apparatus 11 includes the liquid discharge head 21, the attachment unit 18, the operation unit 30 including the display unit 31, and the control unit 13. The liquid discharge head 21 includes the plurality of nozzles 41 and 42, and performs printing on the medium 16 by discharging a liquid from the nozzles 41 and 42. The attachment unit 18 can accept attachment of the plurality of liquid reservoir units 19A and 19B. The liquid reservoir units 19A and 19B reserve a liquid to be supplied to the plurality of nozzles 41 and 42. The attachment unit 18 includes the first attachment portion 51 to which the first liquid reservoir unit 19A that reserves the first liquid L1 having a sedimentation property is attached, and the second attachment portion 52 to which the second liquid reservoir unit 19B that reserves the second liquid L2 having a sedimentation property inferior to that of the first liquid L1 is attached. When the execution of the replacement mode is instructed via the operation of the operation unit 30, the control unit 13 can display, on the display unit 31, display information for prompting removal of the first liquid reservoir unit 19A from the first attachment portion 51 and display information for prompting attachment of a second liquid reservoir unit 19B that is different from the second liquid reservoir unit 19B attached to the second attachment portion 52, to the first attachment portion 51. When the different second liquid reservoir unit 19B is attached to the first attachment portion 51, the second liquid L2 is supplied to the plurality of nozzles 41 that discharge the first liquid L1. According to this configuration, advantageous effects similar to those of the control method of the liquid discharge apparatus 11 described in (1) above can be obtained.

(7) In the liquid discharge apparatus 11, the second liquid L2 is clear ink. According to this configuration, it is possible to prevent nozzle clogging and discharge failure while preventing color mixing by replacing with the clear ink that does not become sedimented.

Second Embodiment

Next, a second embodiment will be described with reference to FIGS. 30 to 44. In the second embodiment, the replacement between a first liquid L1 and a second liquid L2 is performed with intervention of air replacement. Therefore, in order to replace the first liquid L1 with air, an ejection container 65 that can supply air is attached to a first attachment portion 51.

Figure 34:
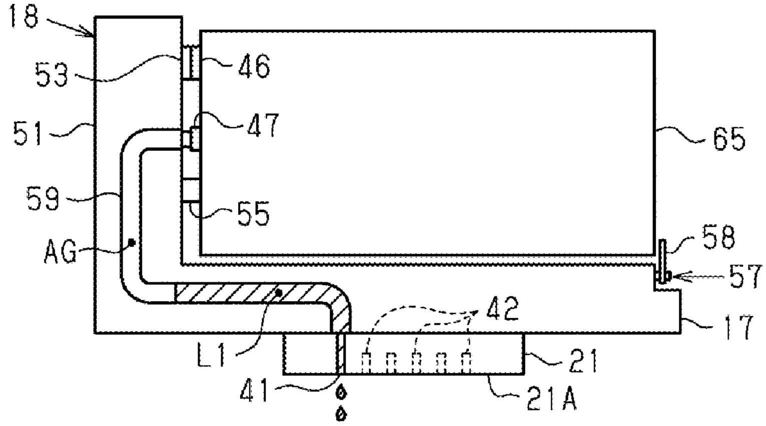
FIG. 34 is a schematic front sectional view of the attachment unit, illustrating a state in which a first liquid in a supply flow path communicating with a first nozzle is being replaced with air.
Figure 36:
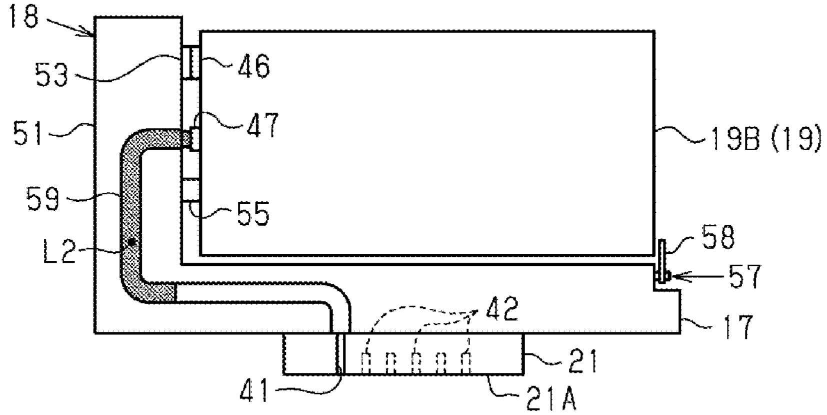
FIG. 36 is a schematic front sectional view of the attachment unit, illustrating a state in which the air in the supply flow path communicating with the first nozzle is being replaced with a second liquid.

In the first embodiment, the second liquid L2 is pushed in from the upstream of a supply flow path 59 to push and eject the first liquid L1 in the supply flow path 59 from first nozzles 41. Accordingly, the first liquid L1 in the supply flow path 59 and the first nozzles 41 is replaced with the second liquid L2. According to the method in the first embodiment, no air replacement is involved so that the total time required for replacement can be shortened. However, at the time of replacement, color mixing (mixing) of part of the first liquid L1 and the second liquid L2 may be occurred. In order to suppress the problem of color mixing, in the second embodiment, the first liquid L1 in the supply flow path 59 is pushed out by the air AG to replace the first liquid L1 with air, as illustrated in FIG. 34. After the air replacement, the air AG in the supply flow path 59 is pushed out by the second liquid L2 to replace the air AG with the second liquid L2 as illustrated in FIG. 36. In this manner, according to the control method of the second embodiment, the color mixing (mixing) of the first liquid L1 and the second liquid L2 is suppressed with intervention of air replacement.

The ejection container 65 is a dummy container attached to eject the first liquid L1 in the supply flow path 59 from the first nozzles 41 by pushing in air from a supply needle 55 upstream of the supply flow path 59. The ejection container 65 is an empty container for pushing in air. The ejection container 65 may take the form of a cartridge, such as a drain cartridge, for example. The ejection container 65 is used in a replacement mode and a re-replacement mode.

Figure 30:
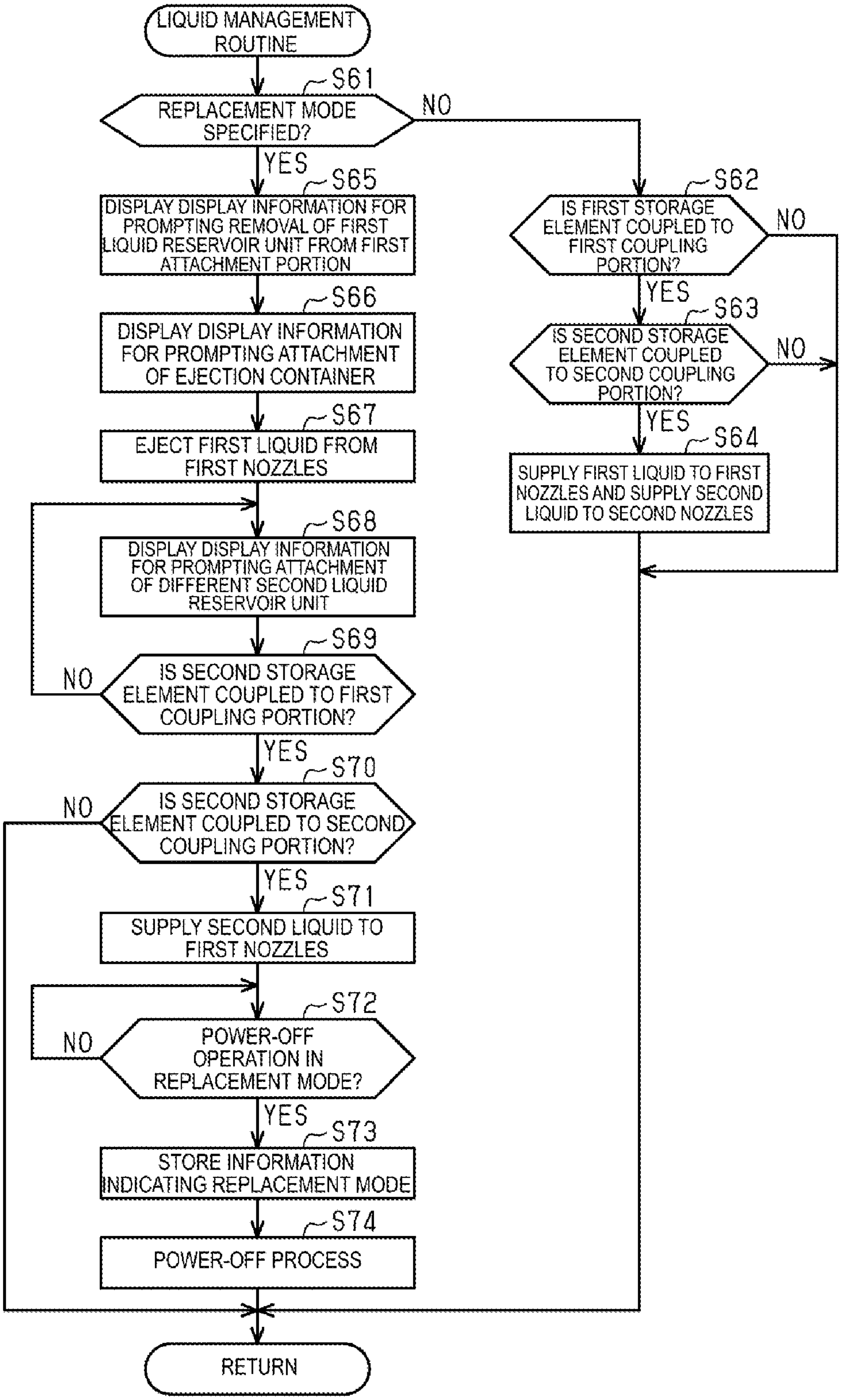
FIG. 30 is a flowchart of a liquid management routine according to a second embodiment.
Figure 37:
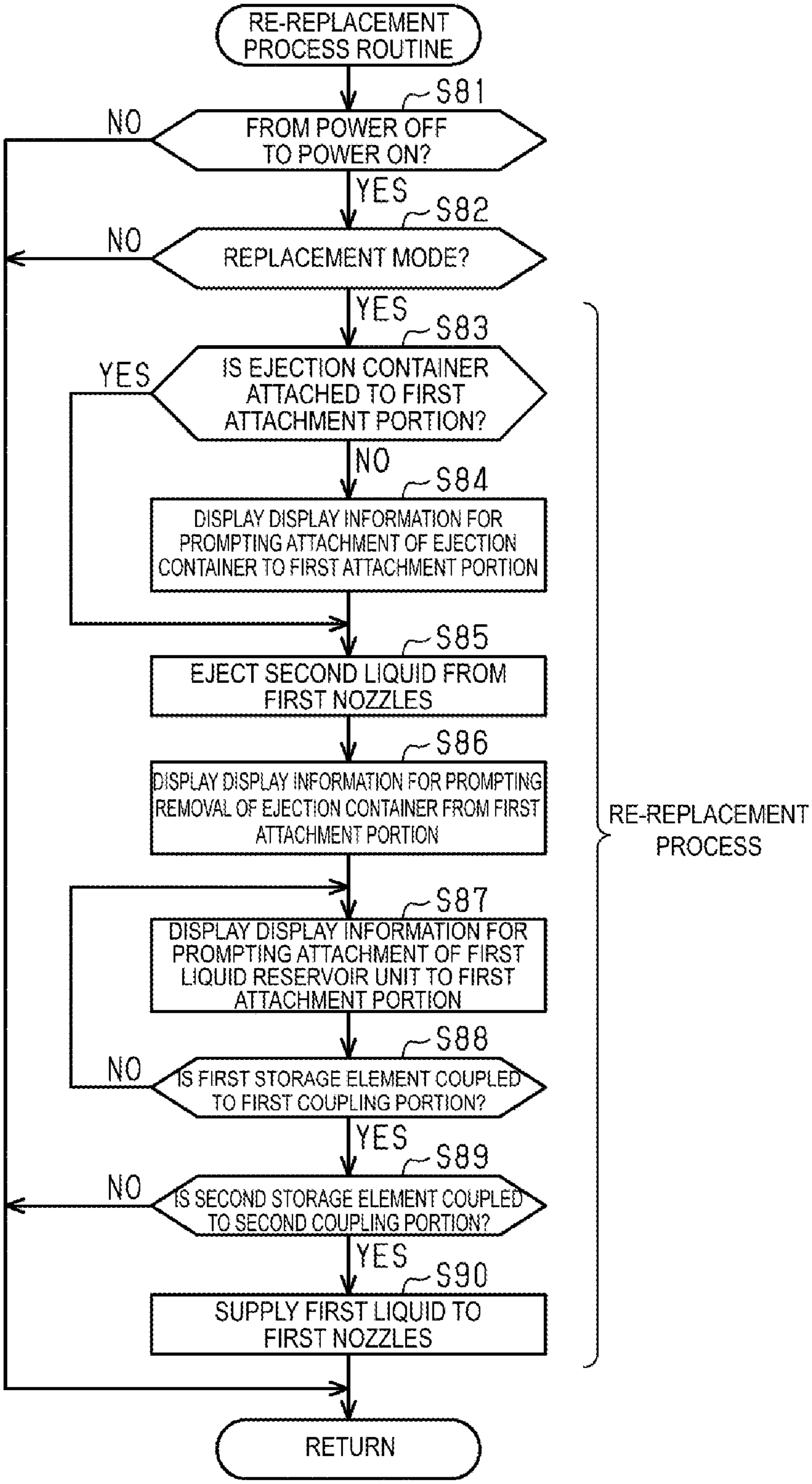
FIG. 37 is a flowchart of re-replacement processing routine.

In the second embodiment, programs PR stored in a storage unit 113 by a computer 110 constituting a control unit 13 include a program for a liquid management routine illustrated in FIG. 30 and a program for re-replacement processing routine illustrated in FIG. 37.

Hereinafter, the liquid management routine and the re-replacement processing routine executed by the computer 110 of the control unit 13 will be described. First, the liquid management routine will be described with reference to FIGS. 30 to 36. Description of steps similar to those in the first embodiment will be simplified or omitted, and different steps will be mainly described.

While there is a possibility of using a liquid discharge apparatus 11 for printing, the liquid discharge apparatus 11 is set to the normal mode. On the other hand, when the liquid discharge apparatus 11 is not to be used for a long period of time, the operator operates the operation unit 30 to instruct the replacement mode. That is, the operator instructs replacement by using the operation button 33 or the touch panel function of the display unit 31. For example, the operator operates the operation unit 30 to display an input screen on the display unit 31 as illustrated in FIG. 12. The operator selects and operates the replacement instruction button 81 by operating the operation unit 30. In this way, when replacement is instructed, the control unit 13 switches from the normal mode to the replacement mode. In the replacement mode, the control unit 13 performs liquid replacement processing of replacing the first liquid L1 in the supply flow path 59 from the first attachment portion 51 to the first nozzles 41 with the second liquid L2 via air replacement.

As illustrated in FIG. 30, in step S61, the computer 110 determines whether the replacement mode has been instructed. In the normal mode in which the replacement mode is not instructed, steps S62 to S64 are executed. Steps S62 to S64 are similar to steps S12 to S14 in the first embodiment.

In step S61, when the computer 110 determines that the replacement mode has been instructed, the processing proceeds to step S65.

In step S65, the computer 110 displays display information for prompting removal of a first liquid reservoir unit 19A from the first attachment portion 51. For example, as illustrated in FIG. 13, the computer 110 displays a message "Remove the first liquid reservoir unit from the first attachment portion" as display information DI on the display unit 31. At this time, the computer 110 controls a lock mechanism 57 to move a lock member 58 to an unlock position, thereby allowing the operator to remove the first liquid reservoir unit 19A. As illustrated in FIG. 14, the operator removes the first liquid reservoir unit 19A from the first attachment portion 51.

Figure 31:
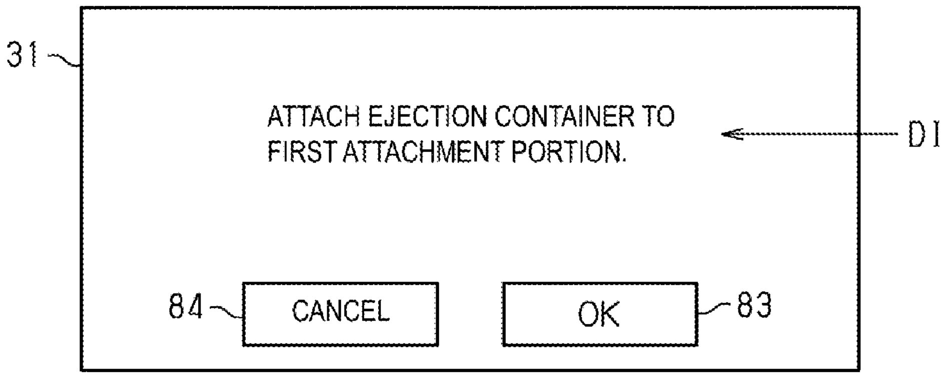
FIG. 31 is a schematic diagram illustrating a display unit that displays display information for prompting attachment of an ejection container.
Figure 32:
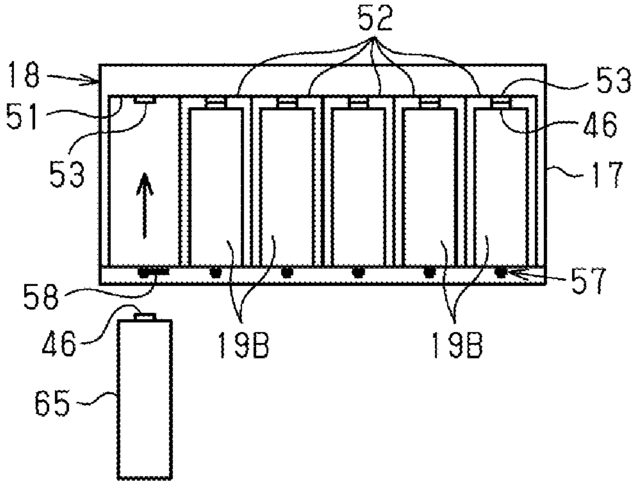
FIG. 32 is a schematic plan view illustrating a state in which the ejection container is being attached to a first attachment portion.
Figure 33:
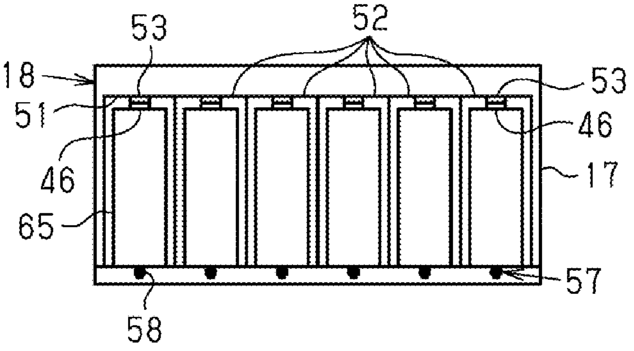
FIG. 33 is a schematic plan view of the attachment unit in which the ejection container is attached to the first attachment portion.

In next step S66, the computer 110 displays, on the display unit 31, display information for prompting attachment of the ejection container 65. As illustrated in FIG. 31, the computer 110 displays, on the display unit 31, a message "Please attach the ejection container to the first attachment portion" as the display information DI. As illustrated in FIG. 32, the operator attaches the ejection container 65 to the first attachment portion 51. As illustrated in FIG. 33, when the attachment of the ejection container 65 to the first attachment portion 51 is completed and the first storage element 46 and the first coupling portion 53 are coupled, the operator operates an OK button 83 on the input screen displayed on the display unit 31 illustrated in FIG. 31.

In next step S67, the computer 110 ejects the first liquid L1 from the first nozzles 41. That is, the computer 110 supplies air to the nozzles 41 (first nozzles 41) that discharge the first liquid L1. Specifically, the computer 110 drives the pump 20 to eject the first liquid L1 from the first nozzles 41 by pressurization or suction. In the case of pressurization, air is pressurized and supplied from the ejection container 65 to the first nozzles 41. On the other hand, in the case of suction, when the first liquid L1 is sucked and ejected from the first nozzles 41, air is drawn into the supply flow path 59 from the ejection container 65 by suction force.

Figure 35:
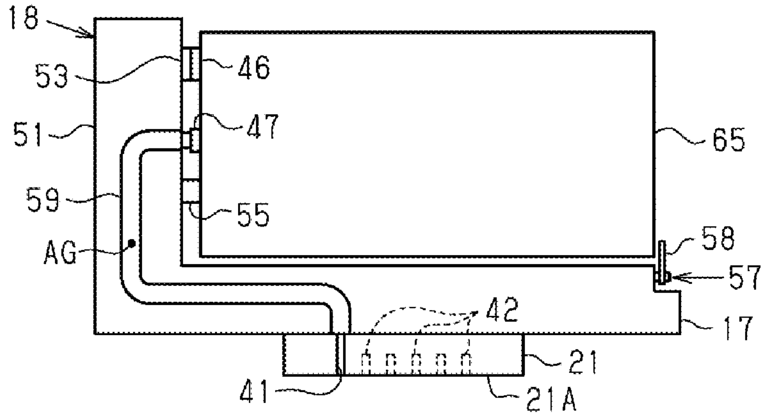
FIG. 35 is a schematic front sectional view of the attachment unit, illustrating a state in which the first liquid in the supply flow path communicating with the first nozzle is replaced with the air.

As illustrated in FIG. 34, when the air AG is supplied from the ejection container 65 toward the liquid discharge head 21, in the supply flow path 59 from the ejection container 65 to the first nozzles 41, the first liquid L1 is pushed and ejected from the first nozzles 41 by the air AG supplied from the upstream. Thus, as illustrated in FIG. 35, the supply flow path 59 communicating with the first nozzles 41 and the first nozzles 41 are filled with the air AG.

In step S68, the computer 110 displays, on the display unit 31, display information for prompting attachment of a different second liquid reservoir unit 19B to the first attachment portion 51. As illustrated in FIG. 15, the computer 110 displays, on the display unit 31, a message "Attach the second liquid reservoir unit to the first attachment portion" as display information DI, for example. As illustrated in FIG. 16, the operator attaches a different second liquid reservoir unit 19B to the first attachment portion 51. As a result, as illustrated in FIG. 17, the second liquid reservoir unit 19B is attached to the first attachment portion 51. Here, the different second liquid reservoir unit 19B refers to a second liquid reservoir unit 19B that is different from the second liquid reservoir unit 19B attached to the second attachment portion 52. For example, a spare second liquid reservoir unit 19B is used as a different second liquid reservoir unit 19B. In the present embodiment, among the second liquid reservoir units 19B, the second liquid reservoir unit 19B that reserves clear ink as the second liquid L2 is used as a different second liquid reservoir unit 19B. This is because even when the second liquid L2 slightly remains in the first liquid L1 and color mixing occurs, the color of the first liquid L1 is not significantly affected. The second liquid reservoir unit 19B that reserves any one type of ink of yellow, cyan, magenta, and black as the second liquid L2 may be used as a different second liquid reservoir unit 19B.

In next step S69, the computer 110 determines whether the second storage element 47 is coupled to the first coupling portion 53. When the second storage element 47 is coupled to the first coupling portion 53, the processing proceeds to step S70. On the other hand, when the second storage element 47 is not coupled to the first coupling portion 53, the processing returns to step S68, and the operation of attaching the second liquid reservoir unit 19B to the first attachment portion 51 is redone. That is, when the first liquid reservoir unit 19A to be attached to the first attachment portion 51 is not attached and the incorrect second liquid reservoir unit 19B is attached, the operator is caused to perform again the operation of attaching the first liquid reservoir unit 19A to the first attachment portion 51. When the correct coupling cannot be confirmed even after the operation is re-performed a predetermined number of times, the routine may be ended.

In next step S70, the computer 110 determines whether the second storage element 47 is coupled to the second coupling portion 54. When the second storage element 47 is coupled to the second coupling portion 54, the processing proceeds to step S71. On the other hand, when the second storage element 47 is not coupled to the second coupling portion 54, the routine is ended. That is, even though the second liquid reservoir unit 19B is attached to the first attachment portion 51, when an object other than the second liquid reservoir unit 19B is attached to the second attachment portion or the second liquid reservoir unit 19B is defectively attached, the routine is ended. In this case, the computer 110 activates an anomaly processing routine (not illustrated), and displays, on the display unit 31, display information for prompting correct attachment of the second liquid reservoir unit 19B to the second attachment portion. When attaching the second liquid reservoir unit 19B to the second attachment portion 52, the operator operates the OK button 83. The computer 110 makes the determination again in step S70, and when the determination result is affirmative, the processing proceeds to step S71.

In next step S71, the computer 110 supplies the second liquid L2 to the first nozzles 41. That is, the computer 110 supplies the second liquid L2 to the nozzles 41 (first nozzles 41) that discharge the first liquid L1. As illustrated in FIG. 36, when the second liquid L2 is supplied from the second liquid reservoir unit 19B toward the liquid discharge head 21, in the supply flow path 59 from the second liquid reservoir unit 19B to the first nozzles 41, the air AG is pushed and ejected from the first nozzles 41 by the second liquid L2 supplied from upstream. Thus, as illustrated in FIG. 19, the supply flow path 59 communicating with the first nozzles 41 is filled with the second liquid L2. When the second liquid L2 is clear ink, for example, the supply flow path 59 communicating with the first nozzles 41 and the first nozzles 41 are filled with the clear ink. In this manner, the first liquid L1 is replaced with the second liquid L2. Therefore, even when the liquid discharge apparatus 11 is not used for a long period of time thereafter, the sedimentation of the coloring materials such as the pigments in the ink does not occur in the first nozzles 41 and the supply flow path 59.

The following steps S72 to S74 are similar to steps S20 to S22 of FIG. 10 in the first embodiment. That is, when the replacement of the first liquid L1 with the second liquid L2 is completed, the operator operates a power switch 32 to shut off the power supply to the liquid discharge apparatus 11. At this time, the liquid discharge apparatus 11 is in the replacement mode. Therefore, when the operation signal of the power switch 32 is input, the computer 110 determines that the power-off operation has been performed while in the replacement mode (affirmative determination in step S72). Then, the computer 110 stores information indicating the replacement mode (step S73). Specifically, the computer 110 writes information indicating the replacement mode in a predetermined storage area of the storage unit 113. Then, the computer 110 performs the power-off processing (step S74).

Thus, the liquid discharge apparatus 11 will not be used for a long period of time. Therefore, the sedimentation of a coloring material such as a pigment does not occur in the first nozzles 41 that discharge the first liquid L1 and the supply flow path 59 communicating with the first nozzles 41. In particular, when the replacement second liquid L2 is clear ink, sedimentation does not occur at all since the ink does not contain a coloring material.

Thereafter, when the use of the liquid discharge apparatus 11 that has not been used for a long period of time is resumed, the second liquid L2 in the supply flow path 59 communicating with the first nozzles 41 is re-replaced with the first liquid L1.

Also in the second embodiment, the re-replacement processing routine includes three methods according to differences in conditions for starting the re-replacement processing. For the first method, when the liquid discharge apparatus 11 has been powered off while in the replacement mode, the re-replacement processing is performed on condition that the liquid discharge apparatus 11 is switched from the power-off state to the power-on state. In this case, it is determined whether the replacement mode is set when the liquid discharge apparatus 11 is switched from the power-off state to the power-on state, and when the replacement mode is set, the re-replacement processing is performed. For example, steps S81 and S82 in FIG. 37 correspond to the processing of determining whether the replacement mode is set when the liquid discharge apparatus 11 is switched from the power-off state to the power-on state. In this case, when it is determined in step S82 that the replacement mode is set, the re-replacement processing in steps S83 to S90 is performed.

For the second method, when the operator operates the operation unit 30 to input instruction of re-replacement, the re-replacement processing is performed. For example, the operator operates the operation unit 30 to display an input screen on the display unit 31 as illustrated in FIG. 23, and selects and operates the re-replacement instruction button 82 on the input screen to instruct re-replacement. For example, step S91 in FIG. 38 corresponds to the processing of determining whether the instruction of re-replacement has been input. In this case, when it is determined in step S91 that the instruction of re-replacement has been input, the re-replacement processing is performed.

For the third method, after the liquid discharge apparatus 11 was switched from the power-off state to the power-on state, when printing using the first liquid L1 is instructed, the re-replacement operation is performed. For example, steps S101 and S102 in FIG. 39 correspond to the processing of determining whether printing using the first liquid L1 is instructed when the liquid discharge apparatus 11 is switched from the power-off state to the power-on state. In this case, when it is determined in step S102 that printing using the first liquid L1 is instructed, the re-replacement processing is performed.

These three methods are different from each other in determination conditions for starting the re-replacement. Even though the determination conditions are different, the re-replacement processing to be performed when the determination conditions are satisfied is common. In any of the methods, the control unit 13 performs the re-replacement processing as in steps S83 to S90 in FIG. 37.

Hereinafter, re-replacement processing routine for performing the re-replacement processing when a first determination condition as an example is satisfied will be described with reference to FIG. 37.

First, in step S81, the computer 110 determines whether the power has been turned from off to on. If the power has been turned from off to on, the processing proceeds to step S82. If the power has not been turned from off to on (for example, including when the power is on), the routine is ended.

In step S82, the computer 110 determines whether the replacement mode is set. The computer 110 determines whether the replacement mode is set, based on the information read from the predetermined storage area of the storage unit 113. That is, the computer 110 determines whether the replacement mode is set, based on the information that was written in the predetermined storage area of the storage unit 113 when the replacement mode was set during the previous power-off time.

In next step S83, the computer 110 determines whether the ejection container 65 is attached to the first attachment portion 51. When the ejection container 65 is attached to the first attachment portion 51, the processing proceeds to step S85, and when the ejection container 65 is not attached to the first attachment portion 51, the processing proceeds to step S84.

Figure 40:
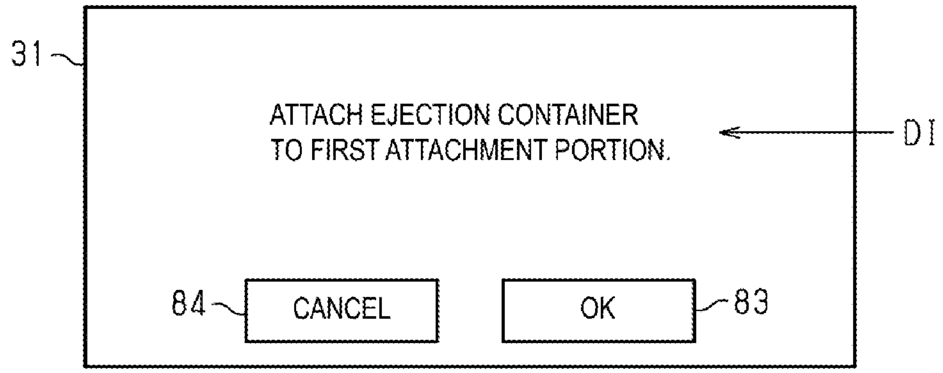
FIG. 40 is a schematic diagram illustrating a display unit that displays display information for prompting attachment of the ejection container to the first attachment portion.
Figure 41:
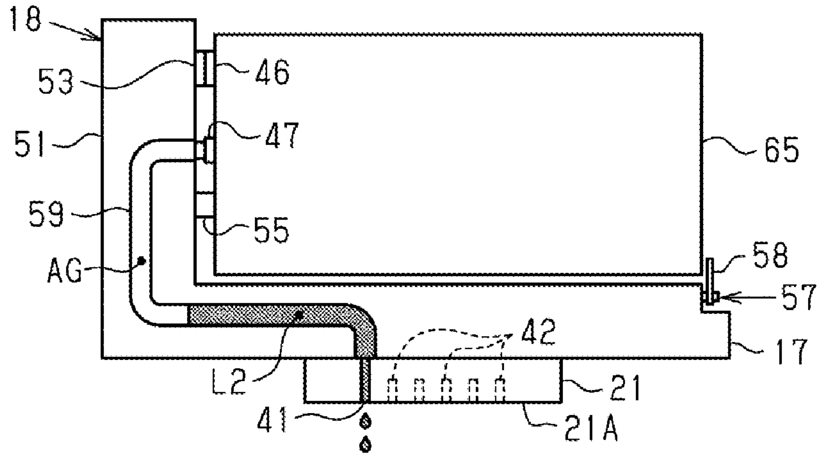
FIG. 41 is a schematic side sectional view of the attachment unit, illustrating a state in which the second liquid in the supply flow path communicating with the first nozzle is being replaced with air.

In step S84, the computer 110 displays, on the display unit 31, display information DI for prompting attachment of the ejection container 65 to the first attachment portion 51. For example, as illustrated in FIG. 40, the computer 110 causes the display unit 31 to display the display information DI "Attach the ejection container to the first attachment portion". The operator who has seen the display information DI removes the second liquid reservoir unit 19B from the first attachment portion 51 as illustrated in FIG. 25, and then attaches the ejection container 65 to the first attachment portion 51 as illustrated in FIG. 32. As illustrated in FIG. 33, when the attachment of the ejection container 65 to the first attachment portion 51 is completed and the first storage element 46 and the first coupling portion 53 are coupled, the operator operates the OK button 83 on the display unit 31 illustrated in FIG. 40.

In next step S85, the computer 110 ejects the second liquid L2 from the first nozzles 41. That is, the computer 110 supplies the air AG to the first nozzles 41. Specifically, the computer 110 drives the pump 20 to eject the second liquid L2 from the first nozzles 41 by pressurization or suction. In the case of pressurization, air is pressurized and supplied from the ejection container 65 to the first nozzles 41. Accordingly, the second liquid L2 is pushed out by the air AG. On the other hand, in the case of suction, when the second liquid L2 is sucked and ejected from the first nozzles 41, air is drawn into the supply flow path 59 from the ejection container 65 by suction force.

As illustrated in FIG. 34, when the air AG is supplied from the ejection container 65 toward the liquid discharge head 21, in the supply flow path 59 from the ejection container 65 to the first nozzles 41, the first liquid L1 is pushed and ejected from the first nozzles 41 by the air AG supplied from the upstream. Thus, as illustrated in FIG. 35, the supply flow path 59 communicating with the first nozzles 41 and the first nozzles 41 are filled with the air AG.

Figure 42:
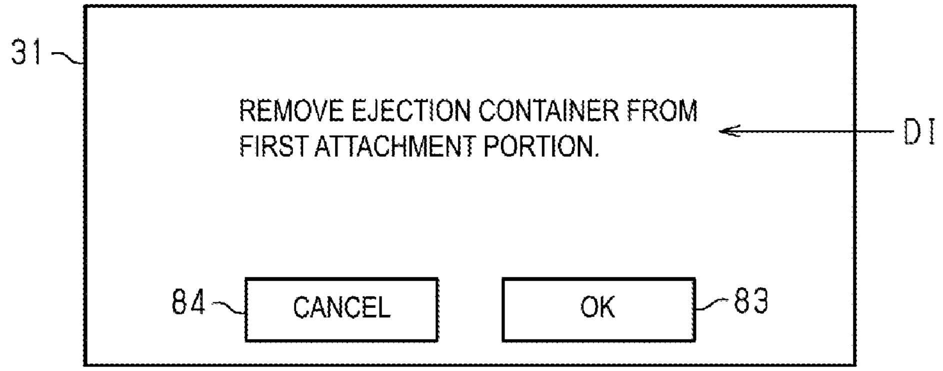
FIG. 42 is a schematic diagram illustrating a display unit that displays display information for prompting removal of the ejection container from the first attachment portion.

In next step S86, the computer 110 displays, on the display unit 31, display information DI for prompting removal of the ejection container 65 from the first attachment portion 51. For example, as illustrated in FIG. 42, the computer 110 causes the display unit 31 to display the display information DI "Remove the ejection container from the first attachment portion". The operator who has seen the display information DI removes the ejection container 65 from the first attachment portion 51, and then attaches the first liquid reservoir unit 19A to the first attachment portion 51 as illustrated in FIG. 26. As illustrated in FIG. 27, when the attachment of the first liquid reservoir unit 19A to the first attachment portion 51 is completed and the first storage element 46 and the first coupling portion 53 are coupled, the operator operates the OK button 83 on the input screen displayed on the display unit 31 illustrated in FIG. 42.

Figure 43:
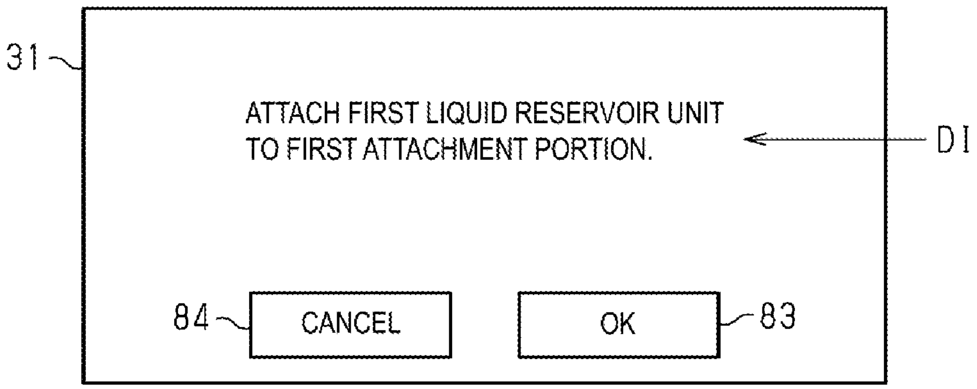
FIG. 43 is a schematic diagram illustrating the display unit that displays display information for prompting attachment of a first liquid reservoir unit to the first attachment portion.

In next step S87, the computer 110 displays, on the display unit 31, display information for prompting attachment of the first liquid reservoir unit 19A to the first attachment portion 51. For example, the computer 110 causes the display unit 31 to display a message "Attach the first liquid reservoir unit to the first attachment portion" as the display information DI as illustrated in FIG. 43. The operator who has seen the display information DI attaches the first liquid reservoir unit 19A to the first attachment portion 51 as illustrated in FIG. 26. As illustrated in FIG. 27, when the attachment of the first liquid reservoir unit 19A to the first attachment portion 51 is completed and the first storage element 46 and the first coupling portion 53 are coupled, the operator operates the OK button 83 on the input screen displayed on the display unit 31 illustrated in FIG. 43.

In step S88, the computer 110 determines whether the first storage element 46 is coupled to the first coupling portion 53. When the first storage element 46 is coupled to the first coupling portion 53, the processing proceeds to step S88, and when the first storage element 46 is not coupled to the first coupling portion 53, the processing returns to step S87. Then, in step S87, the computer 110 displays again, on the display unit 31, the display information for prompting attachment of the first liquid reservoir unit 19A to the first attachment portion 51. Then, when the operator inputs an operation signal by operating the OK button 83 on the input screen displayed on the display unit 31 illustrated in FIG. 43, in step S88, the computer 110 determines whether the first storage element 46 is coupled to the first coupling portion 53. When the first storage element 46 is coupled to the first coupling portion 53, the computer 110 proceeds to step S88.

In step S89, the computer 110 determines whether the second storage element 47 is coupled to the second coupling portion 54. When the second storage element 47 is coupled to the second coupling portion 54, the processing proceeds to step S90, and when the second storage element 47 is not coupled to the second coupling portion 54, the routine is ended. Step S89 is similar to step S36 illustrated in FIG. 20 in the first embodiment, and similar processing is performed when a negative determination is made.

In step S90, the computer 110 supplies the first liquid L1 to the first nozzles 41. That is, the computer 110 supplies the first liquid L1 to the nozzles 41 (first nozzles 41) that discharge the first liquid L1. Specifically, the computer 110 drives the pump 20 to supply the first liquid L1 to the first nozzles 41 by pressurization or suction. In the case of pressurization, the first liquid L1 is pressurized and supplied from the first liquid reservoir unit 19A to the first nozzles 41. On the other hand, in the case of suction, when the air is sucked and ejected from the first nozzles 41, the first liquid L1 is drawn into the supply flow path 59 from the first liquid reservoir unit 19A by suction force.

Figure 44:
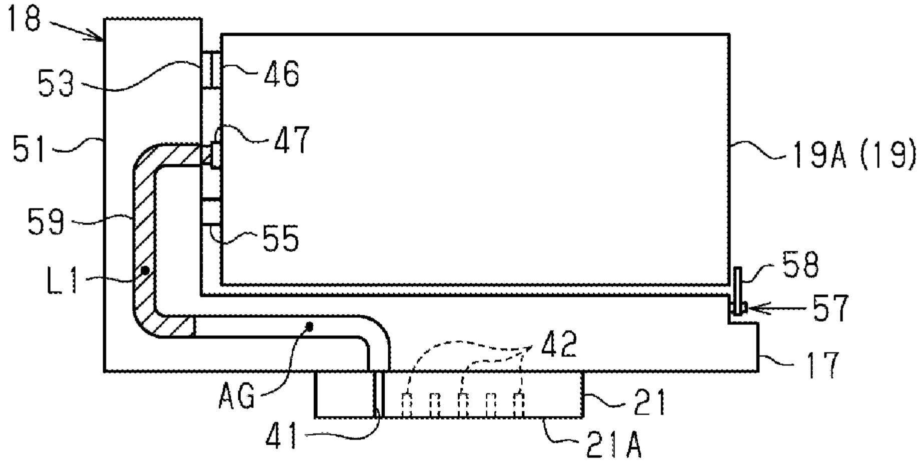
FIG. 44 is a schematic front sectional view of the attachment unit, illustrating a state in which the air in the supply flow path communicating with the first nozzle is being replaced with the first liquid.

As illustrated in FIG. 44, when the first liquid L1 is supplied from the first liquid reservoir unit 19A toward the liquid discharge head 21, in the supply flow path 59 from the first liquid reservoir unit 19A to the first nozzles 41, the air AG is pushed and ejected from the first nozzles 41 by the first liquid L1 supplied from upstream. Thus, as illustrated in FIG. 29, the supply flow path 59 communicating with the first nozzles 41 is filled with the first liquid L1. When the first liquid L1 is white ink, for example, the supply flow path 59 communicating with the first nozzles 41 and the first nozzles 41 are filled with the white ink. As a result of the re-replacement, the liquid discharge apparatus 11 can perform printing using the white ink.

Figure 38:
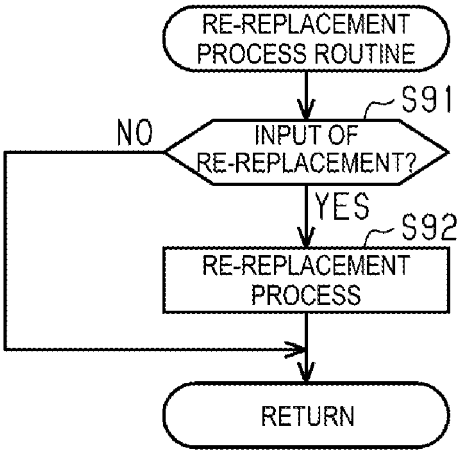
FIG. 38 is a flowchart illustrating re-replacement processing routine different from that in FIG. 37.

Furthermore, as illustrated in FIG. 38, in the routine of performing the re-replacement processing when the second determination condition is satisfied, the processing is performed as described below. For example, the operator displays the input screen illustrated in FIG. 23 on the display unit 31, and operates the operation unit 30 to select and operate the re-replacement instruction button 82 on the input screen. Accordingly, re-replacement is instructed. For example, step S91 in FIG. 38 corresponds to the processing of determining whether the instruction of re-replacement has been input. In step S91, when determining that the instruction of the re-replacement has been input, the computer 110 proceeds to step S92. In step S92, the computer 110 performs the re-replacement processing. The re-replacement processing is similar to the processing in steps S83 to S90 in FIG. 37.

Figure 39:
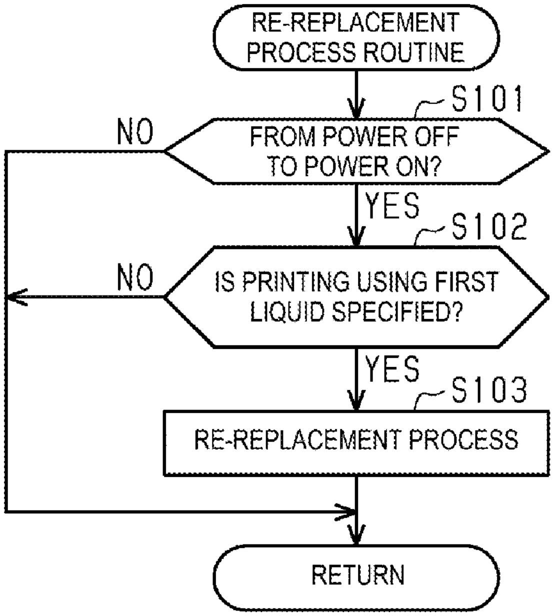
FIG. 39 is a flowchart of re-replacement processing routine different from that in FIG. 38.

Furthermore, as illustrated in FIG. 39, in the routine of performing the re-replacement processing when the third determination condition is satisfied, the processing is performed as described below. For example, in step S101 in FIG. 39, the computer 110 determines whether the coupled the liquid discharge apparatus 11 has been switched from off to on. When the coupled the liquid discharge apparatus 11 has been switched from off to on, the processing proceeds to step S102, and when the coupled the liquid discharge apparatus 11 has not been switched from off to on, the routine is ended.

In step S102, the computer 110 determines whether printing using the first liquid L1 has been instructed. If printing using the first liquid L1 has been instructed, the processing proceeds to step S103, and if printing using the first liquid L1 has not been instructed, the routine is ended.

In step S103, the computer 110 performs the re-replacement processing. In this manner, when printing using the first liquid L1 has been instructed when the power was switched from off to on, the computer 110 performs the re-replacement processing. The re-replacement processing is similar to the processing in steps S83 to S90 in FIG. 37.

Advantageous Effects of Second Embodiment

According to the second embodiment, the following advantageous effects can be obtained.

(8) The control method of the liquid discharge apparatus 11 includes the following steps (8*a*) and (8*b*). (8*a*) In the replacement mode, before displaying, on the display unit 31, display information for prompting attachment of a different second liquid reservoir unit 19B to the first attachment portion 51 (step S68), displaying, on the display unit 31, display information for prompting attachment of the ejection container 65 to the first attachment portion 51 (step S65). (8*b*) After the ejection container 65 is attached to the first attachment portion 51, ejecting the first liquid L1 from the plurality of nozzles 41 that discharge the first liquid L1 (step S67). According to this method, it is possible to smoothly charge the second liquid L2 by ejecting the first liquid L1 and replacing with the air before replacement of the liquid reservoir units 19A and 19B.

(9) The control method of the liquid discharge apparatus 11 includes the following steps (9*a*) to (9*c*). (9*a*) When the liquid discharge apparatus 11 is powered off while in the replacement mode, after the coupled the liquid discharge apparatus 11 is switched from the off state to the on state (step S81), determining whether the ejection container 65 is attached to the first attachment portion 51 (step S83). (9*b*) If the ejection container 65 is not attached to the first attachment portion 51, displaying, on the display unit 31, display information DI for prompting attachment of the ejection container 65 to the first attachment portion 51 (step S84). (9*c*) If it is determined that the ejection container 65 is attached to the first attachment portion 51, ejecting the second liquid L2 from the plurality of nozzles 41 that discharge the first liquid L1 (step S85). According to this method, when the liquid discharge apparatus 11 is restored, the operation of recharging the first liquid L1 is automatically performed, whereby it is possible to save time and improve workability.

(10) The control method of the liquid discharge apparatus 11 includes the following steps (10*a*) to (10*c*). (10*a*) When the execution of the re-replacement mode is instructed through the operation of the operation unit 30 (step S91), determining whether the ejection container 65 is attached to the first attachment portion 51 (step S83). (10*b*) If the ejection container 65 is not attached to the first attachment portion 51, displaying, on the display unit 31, display information DI for prompting attachment of the ejection container 65 to the first attachment portion 51 (step S84). (10*c*) If it is determined that the ejection container 65 is attached to the first attachment portion 51, ejecting the second liquid L2 from the plurality of nozzles 41 that discharge the first liquid L1 (step S85). According to this method, it is possible to prevent nozzle clogging by maintaining the replacement state by performing the operation of recharging only when the re-replacement mode is selected.

(11) The control method of the liquid discharge (11*a*) apparatus 11 includes the following steps (11*a*) to (11*c*). After the coupled the liquid discharge apparatus 11 is switched from the off state to the on state, in the case of using the first liquid L1 for printing, determining whether the ejection container 65 is attached to the first attachment portion 51 (steps S101, S102, and S83). (11*b*) If the ejection container 65 is not attached to the first attachment portion 51, displaying, on the display unit 31, display information for prompting attachment of the ejection container 65 to the first attachment portion 51 (step S84). (11*c*) If it is determined that the ejection container 65 is attached to the first attachment portion 51, ejecting the second liquid L2 from the plurality of nozzles 41 that discharge the first liquid L1 (step S85). According to this method, it is possible to prevent nozzle clogging and discharge failure by maintaining the replacement state until the first liquid L1 is used. In the case of using the first liquid L1 for printing, the operation of recharging the first liquid L1 is automatically performed, whereby it is possible to save time and improve workability.

MODIFIED EXAMPLES

The present embodiment can be modified as described below. The present embodiment and the following modified examples can be implemented in combination with each other without technical contradictions.

- The first liquid L1 is not limited to white ink as long as the first liquid L1 has a sedimentation property superior to that of the second liquid L2. The second liquid L2 is not limited to clear ink as long as the second liquid L2 has a sedimentation property inferior to that of the first liquid L1 or does not become sedimented.
- Referring to FIG. 10, "displaying, on the display unit, display information for prompting detachment of the first liquid reservoir unit from the first attachment portion" (step S15) and "displaying, on the display unit, display information for prompting attachment of the second liquid reservoir unit not attached to the second attachment portion, to the first attachment portion" (step S16) may be displayed at the same time or at different timings.
- The replacement mode may be selected when the operator determines not to use the apparatus for a long time. When the processing in the replacement mode is not performed when the apparatus is powered off, a confirmation screen for confirming whether replacement is not required may be displayed on the display unit 31.
- After the replacement of the first liquid L1 with the second liquid L2 is completed, display information for prompting removal of the second liquid reservoir unit 19B and re-attachment of the first liquid reservoir unit 19A or the ejection container 65 may be displayed. Although releasing the first attachment portion 51 from the locking by the lock mechanism 57 is required, it is not necessary to display the display information for prompting removal of the second liquid reservoir unit 19B. In this case, the operator can select whether to perform replacement of the second liquid reservoir unit 19B. After the removal of the second liquid reservoir unit 19B by the operator is detected, display information for prompting re-attachment of the first liquid reservoir unit 19A or the ejection container 65 may be displayed. The power may be turned off in a state where the second liquid reservoir unit 19B remains attached.
- The ejection method in each of the above-described embodiments may be any method that makes it possible to eject the first liquid L1 from the nozzles 41, such as pressure cleaning or suction cleaning.
- The liquid management routine illustrated in FIG. 10 and the re-replacement processing routine illustrated in FIG. 37 may be performed in combination. The liquid management routine illustrated in FIG. 30 and the re-replacement processing routine illustrated in FIG. 20 may be performed in combination.
- In the second embodiment, the ejection container 65 may not be provided. That is, the ejection container 65 is not limited to the form of a cartridge. For example, the case portion of the cartridge may not be provided, and a dummy supply member having the storage element and the supply portion among the storage element, the supply portion, and the pin hole may be attached. When the storage element can be coupled and the supply portion can be coupled, the first liquid L1 in the supply flow path 59 from the supply portion to the first nozzles 41 via the supply needle can be replaced with air, and the second liquid L2 in the supply flow path 59 to the first nozzles 41 can be replaced with air. The storage element may not be provided. In this case, the operator may notify the control unit 13 via the operation of the operation unit 30 that the dummy supply member has been attached to the first attachment portion 51.
- In the second embodiment, the reason why the ejection container 65 (drain cartridge) is attached to the first attachment portion 51 after the first liquid L1 is replaced with the second liquid L2 may be that the apparatus does not work unless all the cartridges are attached to the attachment portions 51 and 52.
- In the second embodiment, when the liquid reservoir unit 19 does not have the storage element 46, the dummy ejection container 65 may not be provided. That is, the liquid in the supply flow path 59 may be replaced with air in a state where nothing is attached to the first attachment portion 51.
- The clear ink used as the second liquid L2 may be a type that solidifies after printing. For example, the clear ink may contain an ultraviolet curable resin or a thermosetting resin. In this case, after the clear ink is discharged onto the medium 16, the clear ink applied to the medium 16 is irradiated with ultraviolet light to cure the clear ink. Alternatively, after the clear ink is discharged onto the medium 16, the clear ink applied to the medium 16 is subjected to heat treatment to cure the clear ink. The clear ink may not contain a curing resin.
- The wiper 23 of the wiping unit 22 is not limited to a cloth wiper, and may be a wiper blade.
- The liquid discharge apparatus 11 may be a textile printing apparatus that discharges a liquid such as ink onto fabric which is an example of a medium, to perform printing on the medium.
- The liquid discharge apparatus 11 may be an inkjet printer that includes a feeding unit to which a roll of a long medium 16 such as roll paper is wound is attachable, and that performs printing on the roll paper.
- A discharge driving element built in the liquid discharge head 21 for discharging a liquid such as ink from the nozzles 40 may be of any driving type such as a piezoelectric type, an electrostatic type, or a bubble type.

The liquid discharge apparatus 11 is not limited to a lateral printer, and may be a serial printer, a line printer, or a page printer.

The liquid discharge apparatus 11 may be a multifunction peripheral having an image reading unit such as a scanner.

The medium 16 may be paper, a plastic sheet or film, a metal sheet or film, a medium including paper and plastic, a laminate sheet including metal and plastic, or the like.

The liquid discharge apparatus 11 is not limited to a printing apparatus that discharges ink as an example of liquid. The liquid discharge apparatus 11 may discharge a liquid other than ink. The state of the liquid discharged from the liquid discharge apparatus 11 in droplets includes a particulate form, a teardrop form, and a thread-like extending form. The liquid here may be any material that can be discharged from the liquid discharge apparatus 11. For example, the liquid may be any matter in a state of being in a liquid phase, and includes a liquid body having high or low viscosity, as well as a fluid body such as sol, gel water, other inorganic solvents, an organic solvent, a solution, a liquid resin, and a liquid metal (metal melt). The liquid includes not only liquid as a single state of the substance, but also includes particles of a functional material made of a solid such as pigment or metal particles dissolved in a solvent, dispersed or mixed in a solvent, and the like. Typical examples of the liquid include ink described in the embodiment above and liquid crystal. The ink here includes various liquid compositions such as general aqueous ink and solvent ink, gel ink, and hot-melt ink. Examples of the liquid discharge apparatus 11 include an apparatus that discharges a liquid including a material such as an electrode material and a color material used in manufacture of liquid crystal displays, electroluminescent (EL) displays, surface emitting displays, color filters and the like in a dispersed or dissolved form. The liquid discharge apparatus 11 may be an apparatus that discharges bioorganic substances used for biochip manufacturing, an apparatus that is used as a precision pipette and discharges a liquid to be a sample, a textile printing apparatus, a micro dispenser, or the like. The liquid discharge apparatus 11 may be an apparatus that discharges a lubricant to a precision machine such as a clock or a camera in a pinpoint manner, or an apparatus that discharges a transparent resin liquid such as an ultraviolet cure resin or the like on a substrate for forming a tiny hemispherical lens (optical lens) or the like used for an optical communication element and the like. The liquid discharge apparatus 11 may be an apparatus that discharges an etching liquid of an acid or an alkali for etching a substrate or the like. When the liquid discharge apparatus is not to be used for a long period of time, a different second liquid reservoir unit 19B may be attached to the first attachment portion instead of the first liquid reservoir unit 19A.

Hereinafter, technical concepts and working effects thereof that are derived from the above-described embodiments and modified examples will be described.

(A) A control method of a liquid discharge apparatus, the liquid discharge apparatus including a liquid discharge head including a plurality of nozzles and configured to perform printing on a medium by discharging a liquid from the plurality of nozzles, an attachment unit to which a plurality of liquid reservoir units reserving the liquid to be supplied to the plurality of nozzles is attachable, and an operation unit including a display unit, the attachment unit including a first attachment portion to which a first liquid reservoir unit reserving a first liquid having a sedimentation property is to be attached and a second attachment portion to which a second liquid reservoir unit reserving a second liquid having a sedimentation property inferior to that of the first liquid is to be attached, includes: in a case in which execution of a replacement mode is instructed via operation of the operation unit, displaying, on the display unit, display information for prompting removal of the first liquid reservoir unit from the first attachment portion; displaying, on the display unit, display information for prompting attachment of a different second liquid reservoir unit from the second liquid reservoir unit attached to the second attachment portion, to the first attachment portion; and when the different second liquid reservoir unit is attached to the first attachment portion, supplying the second liquid to the plurality of nozzles that discharge the first liquid.

According to this method, in the replacement mode that is selected when the liquid discharge operation is not to be performed for a long period of time, the first liquid having a sedimentation property is replaced with the second liquid (liquid used for other printing) having a sedimentation property inferior to that of the first liquid, whereby it is possible to suppress clogging and discharge failure of the nozzles while reducing the cost and space for preparing a dedicated liquid. It is considered that the liquid discharge operation is not to be performed for a long period of time during storage and transportation of the apparatus and the liquid discharge head, while the discharge of the liquid discharge head is suspended, or the like.

(B) In the control method of the liquid discharge apparatus according to (A), the replacement mode may include: before displaying, on the display unit, the display information for prompting attachment of the different second liquid reservoir unit to the first attachment portion, displaying, on the display unit, display information for prompting attachment of an ejection container to the first attachment portion; and after the ejection container is attached to the first attachment portion, ejecting the first liquid from the plurality of nozzles that discharge the first liquid. According to this method, it is possible to smoothly charge the second liquid by ejecting the first liquid and replacing with the air before replacement of the liquid reservoir units.

(C) In the control method of the liquid discharge apparatus according to (A) or (B), the first liquid reservoir unit may include a first storage element storing information of the first liquid reservoir unit, the second liquid reservoir unit may include a second storage element storing information of the second liquid reservoir unit, the first attachment portion may include a first coupling portion to be electrically coupled to the first storage element, the second attachment portion may include a second coupling portion to be electrically coupled to the second storage element, and the control method may further include: in a normal state, determining that the liquid discharge apparatus is operable when the first storage element of the first liquid reservoir unit is coupled to the first coupling portion and the second storage element of the second liquid reservoir unit is coupled to the second coupling portion; and in the replacement mode, determining that the liquid discharge apparatus is operable when the second storage element of the second liquid reservoir unit is coupled to the first coupling portion and the second storage element of the second liquid reservoir unit is coupled to the second coupling portion. According to this method, the second liquid in the second liquid reservoir unit attached to the first attachment portion is made usable only in the replacement mode, so that it is possible to prevent the second liquid from being erroneously used in the normal state.

(D) The control method of the liquid discharge apparatus according to (A) may further include: when power supply to the liquid discharge apparatus is turned off while in the replacement mode, determining whether the first liquid reservoir unit is attached to the first attachment portion after the power supply to the liquid discharge apparatus is switched from an off state to an on state; if it is determined that the first liquid reservoir unit is not attached to the first attachment portion, displaying, on the display unit, display information for prompting attachment of the first liquid reservoir unit to the first attachment portion; and if it is determined that the first liquid reservoir unit is attached to the first attachment portion, supplying the first liquid to the plurality of nozzles that discharge the first liquid. According to this method, when the liquid discharge apparatus is restored, the operation of recharging the first liquid is automatically performed, whereby it is possible to save time and improve workability.

(E) The control method of a liquid discharge apparatus according to (A) may further include: when power supply to the liquid discharge apparatus is turned off while in the replacement mode, determining whether the ejection container is attached to the first attachment portion after the power supply to the liquid discharge apparatus is switched from an off state to an on state; if it is determined that the ejection container is not attached to the first attachment portion, displaying, on the display unit, display information for prompting attachment of the ejection container to the first attachment portion; and if it is determined that the ejection container is attached to the first attachment portion, ejecting the second liquid from the plurality of nozzles that discharge the first liquid. According to this method, when the liquid discharge apparatus is restored, the operation of recharging the first liquid is automatically performed, whereby it is possible to save time and improve workability.

(F) The control method of the liquid discharge apparatus according to (A) may further include: when execution of a re-replacement mode is instructed via operation of the operation unit, determining whether the first liquid reservoir unit is attached to the first attachment portion; if it is determined that the first liquid reservoir unit is not attached to the first attachment portion, displaying, on the display unit, display information for prompting attachment of the first liquid reservoir unit to the first attachment portion; and if it is determined that the first liquid reservoir unit is attached to the first attachment portion, supplying the first liquid to the plurality of nozzles that discharge the first liquid. According to this method, it is possible to prevent nozzle clogging by maintaining the replacement state by performing the operation of recharging only when the re-replacement mode is selected.

(G) The control method of a liquid discharge apparatus according to (A) may further include: when execution of a re-replacement mode is instructed via operation of the operation unit, determining whether the ejection container is attached to the first attachment portion; if it is determined that the ejection container is not attached to the first attachment portion, displaying, on the display unit, display information for prompting attachment of the ejection container to the first attachment portion; and if it is determined that the ejection container is attached to the first attachment portion, ejecting the second liquid from the plurality of nozzles that discharge the first liquid. According to this method, it is possible to prevent nozzle clogging by maintaining the replacement state by performing the operation of recharging only when the re-replacement mode is selected.

(H) The control method of the liquid discharge apparatus according to (A) may further include: when the first liquid is to be used for the printing after the power supply to the liquid discharge apparatus is switched from an off state to an on state, determining whether the first liquid reservoir unit is attached to the first attachment portion; if it is determined that the first liquid reservoir unit is not attached to the first attachment portion, displaying, on the display unit, display information for prompting attachment of the first liquid reservoir unit to the first attachment portion; and if it is determined that the first liquid reservoir unit is attached to the first attachment portion, supplying the first liquid to the plurality of nozzles that discharge the first liquid. According to this method, it is possible to prevent nozzle clogging and discharge failure by maintaining the replacement state until the first liquid is used. In the case of using the first liquid for printing, the operation of recharging the first liquid is automatically performed, whereby it is possible to save time and improve workability.

(I) The control method of a liquid discharge apparatus according to (A) may further include: when the first liquid is to be used for the printing after power supply to the liquid discharge apparatus is switched from an off state to an on state, determining whether the ejection container is attached to the first attachment portion; if it is determined that the ejection container is not attached to the first attachment portion, displaying, on the display unit, display information for prompting attachment of the ejection container to the first attachment portion; and if it is determined that the ejection container is attached to the first attachment portion, ejecting the second liquid from the plurality of nozzles that discharge the first liquid. According to this method, it is possible to prevent nozzle clogging and discharge failure by maintaining the replacement state until the first liquid is used. In the case of using the first liquid for printing, the operation of recharging the first liquid is automatically performed, whereby it is possible to save time and improve workability.

(J) A liquid discharge apparatus includes: a liquid discharge head including a plurality of nozzles and configured to perform printing on a medium by discharging a liquid from the plurality of nozzles; an attachment unit to which a plurality of liquid reservoir units reserving the liquid to be supplied to the plurality of nozzles is attachable; an operation unit including a display unit; and a control unit, in which the attachment unit includes a first attachment portion to which a first liquid reservoir unit reserving a first liquid having a sedimentation property is to be attached and a second attachment portion to which a second liquid reservoir unit reserving a second liquid having a sedimentation property inferior to that of the first liquid is to be attached, and in a case in which execution of a replacement mode (that is selected when a liquid discharge operation is not to be performed for a long period of time) is instructed via operation of the operation unit, the control unit can display, on the display unit, display information for prompting removal of the first liquid reservoir unit from the first attachment portion and display information for prompting attachment of a different second liquid reservoir unit from the second liquid reservoir unit attached to the second attachment portion, to the first attachment portion, and when the different second liquid reservoir unit is attached to the first attachment portion, the control unit supplies the second liquid to the plurality of nozzles that discharge the first liquid. According to this configuration, advantageous effects similar to those of the control method of the liquid discharge apparatus described in (A) above can be obtained.

(K) In the liquid discharge apparatus according to (J), the second liquid may be clear ink. According to this configuration, it is possible to prevent nozzle clogging and discharge failure while preventing color mixing by replacing with the clear ink that does not become sedimented.

What is claimed is:

1. A control method of a liquid discharge apparatus, the liquid discharge apparatus including a liquid discharge head including a plurality of nozzles and configured to perform printing on a medium by discharging a liquid from the plurality of nozzles, an attachment unit to which a plurality of liquid reservoir units reserving the liquid to be supplied to the plurality of nozzles is attachable, and an operation unit including a display unit, the attachment unit including a first attachment portion to which a first liquid reservoir unit reserving a first liquid having a sedimentation property is to be attached and a second attachment portion to which a second liquid reservoir unit reserving a second liquid having a sedimentation property inferior to that of the first liquid is to be attached, the control method comprising:

in a case in which execution of a replacement mode is instructed via operation of the operation unit, displaying, on the display unit, display information for prompting removal of the first liquid reservoir unit from the first attachment portion;

displaying, on the display unit, display information for prompting attachment of a different second liquid reservoir unit from the second liquid reservoir unit attached to the second attachment portion, to the first attachment portion; and when the different second liquid reservoir unit is attached to the first attachment portion, supplying the second liquid to the plurality of nozzles configured to discharge the first liquid.

2. The control method of the liquid discharge apparatus according to claim 1, wherein the replacement mode includes:

before displaying, on the display unit, the display information for prompting attachment of the different second liquid reservoir unit to the first attachment portion, displaying, on the display unit, display information for prompting attachment of an ejection container to the first attachment portion and after the ejection container is attached to the first attachment portion, ejecting the first liquid from the plurality of nozzles configured to discharge the first liquid.

3. The control method of the liquid discharge apparatus according to claim 1, wherein the first liquid reservoir unit includes a first storage element configured to store information of the first liquid reservoir unit, the second liquid reservoir unit includes a second storage element configured to store information of the second liquid reservoir unit, the first attachment portion includes a first coupling portion to be electrically coupled to the first storage element, the second attachment portion includes a second coupling portion to be electrically coupled to the second storage element, and the control method further comprises:

in a normal state, determining that the liquid discharge apparatus is operable when the first storage element of the first liquid reservoir unit is coupled to the first coupling portion and the second storage element of the second liquid reservoir unit is coupled to the second coupling portion; and in the replacement mode, determining that the liquid discharge apparatus is operable when the second storage element of the second liquid reservoir unit is coupled to the first coupling portion and the second storage element of the second liquid reservoir unit is coupled to the second coupling portion.

4. The control method of the liquid discharge apparatus according to claim 1, the control method further comprising:

when power supply to the liquid discharge apparatus is turned off while in the replacement mode, determining whether the first liquid reservoir unit is attached to the first attachment portion after the power supply to the liquid discharge apparatus is switched from an off state to an on state;

if it is determined that the first liquid reservoir unit is not attached to the first attachment portion, displaying, on the display unit, display information for prompting attachment of the first liquid reservoir unit to the first attachment portion; and if it is determined that the first liquid reservoir unit is attached to the first attachment portion, supplying the first liquid to the plurality of nozzles configured to discharge the first liquid.

5. The control method of the liquid discharge apparatus according to claim 1, the control method further comprising:

when power supply to the liquid discharge apparatus is turned off while in the replacement mode, determining whether the ejection container is attached to the first attachment portion after the power supply to the liquid discharge apparatus is switched from an off state to an on state;

if it is determined that the ejection container is not attached to the first attachment portion, displaying, on the display unit, display information for prompting attachment of the ejection container to the first attachment portion; and if it is determined that the ejection container is attached to the first attachment portion, ejecting the second liquid from the plurality of nozzles configured to discharge the first liquid.

6. The control method of the liquid discharge apparatus according to claim 1, the control method further comprising:

when execution of a re-replacement mode is instructed via operation of the operation unit, determining whether the first liquid reservoir unit is attached to the first attachment portion;

if it is determined that the first liquid reservoir unit is not attached to the first attachment portion, displaying, on the display unit, display information for prompting attachment of the first liquid reservoir unit to the first attachment portion; and if it is determined that the first liquid reservoir unit is attached to the first attachment portion, supplying the first liquid to the plurality of nozzles configured to discharge the first liquid.

7. The control method of the liquid discharge apparatus according to claim 1, the control method further comprising:

when execution of a re-replacement mode is instructed via operation of the operation unit, determining whether the ejection container is attached to the first attachment portion;

if it is determined that the ejection container is not attached to the first attachment portion, displaying, on the display unit, display information for prompting attachment of the ejection container to the first attachment portion; and if it is determined that the ejection container is attached to the first attachment portion, ejecting the second liquid from the plurality of nozzles configured to discharge the first liquid.

8. The control method of the liquid discharge apparatus according to claim 1, the control method further comprising:

when the first liquid is to be used for the printing after the power supply to the liquid discharge apparatus is switched from an off state to an on state, determining whether the first liquid reservoir unit is attached to the first attachment portion;

if it is determined that the first liquid reservoir unit is not attached to the first attachment portion, displaying, on the display unit, display information for prompting attachment of the first liquid reservoir unit to the first attachment portion; and if it is determined that the first liquid reservoir unit is attached to the first attachment portion, supplying the first liquid to the plurality of nozzles configured to discharge the first liquid.

9. The control method of the liquid discharge apparatus according to claim 1, the control method further comprising:

when the first liquid is to be used for the printing after power supply to the liquid discharge apparatus is switched from an off state to an on state, determining whether the ejection container is attached to the first attachment portion;

if it is determined that the ejection container is not attached to the first attachment portion, displaying, on the display unit, display information for prompting attachment of the ejection container to the first attachment portion; and if it is determined that the ejection container is attached to the first attachment portion, ejecting the second liquid from the plurality of nozzles configured to discharge the first liquid.

10. A liquid discharge apparatus comprising:

a liquid discharge head including a plurality of nozzles and configured to perform printing on a medium by discharging a liquid from the plurality of nozzles;

an attachment unit to which a plurality of liquid reservoir units reserving the liquid to be supplied to the plurality of nozzles is attachable;

an operation unit including a display unit; and a control unit, wherein the attachment unit includes a first attachment portion to which a first liquid reservoir unit reserving a first liquid having a sedimentation property is to be attached and a second attachment portion to which a second liquid reservoir unit reserving a second liquid having a sedimentation property inferior to that of the first liquid is to be attached and in a case in which execution of a replacement mode is instructed via operation of the operation unit, the control unit is configured to display, on the display unit, display information for prompting removal of the first liquid reservoir unit from the first attachment portion and display information for prompting attachment of a different second liquid reservoir unit from the second liquid reservoir unit attached to the second attachment portion, to the first attachment portion and when the different second liquid reservoir unit is attached to the first attachment portion, the control unit supplies the second liquid to the plurality of nozzles configured to discharge the first liquid.

11. The liquid discharge apparatus according to claim 10, wherein the second liquid is clear ink.

* * * * *